United States Patent
Zedda et al.

(10) Patent No.: US 6,762,226 B2
(45) Date of Patent: Jul. 13, 2004

(54) COMPOSITIONS STABILIZED BY DIOXOPIPERAZINYL DERIVATIVES

(75) Inventors: Alessandro Zedda, Casalecchio di Reno (IT); Graziano Zagnoni, Vergato (IT); Massimiliano Sala, Modena (IT); Dario Lazzari, Casalecchio di Reno (IT); Stephen Mark Andrews, New Fairfield, CT (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/272,193

(22) Filed: Oct. 15, 2002

(65) Prior Publication Data

US 2003/0139500 A1 Jul. 24, 2003

Related U.S. Application Data

(63) Continuation of application No. 09/826,404, filed on Apr. 2, 2001, now abandoned, which is a continuation of application No. 09/315,703, filed on May 20, 1999, now abandoned.

(30) Foreign Application Priority Data

Jun. 2, 1998 (EP) ............................................ 98810507

(51) Int. Cl.$^7$ .................... C07D 403/04; C07D 403/14; C08K 5/3462; C08K 5/3475; C08K 5/3492
(52) U.S. Cl. ...................... 524/100; 524/102; 524/103; 524/106; 544/384
(58) Field of Search .......................... 544/384; 524/100, 524/102, 106

(56) References Cited

U.S. PATENT DOCUMENTS

| | | | |
|---|---|---|---|
| 3,919,234 A | 11/1975 | Ramey et al. | 260/268 |
| 3,920,659 A | 11/1975 | Ramey et al. | 260/268 |
| 3,928,330 A | 12/1975 | Ramey et al. | 260/242 |
| 3,928,357 A | 12/1975 | Ramey et al. | 260/268 |
| 3,936,456 A | 2/1976 | Ramey et al. | 260/268 |
| 3,968,078 A | 7/1976 | Ramey et al. | 260/45.8 |
| 3,969,316 A | 7/1976 | Ramey et al. | 260/45.8 |
| 4,067,848 A | 1/1978 | Ramey et al. | 260/45.8 |
| 4,118,369 A | 10/1978 | Minagawa et al. | 260/45.8 |
| 4,413,096 A | 11/1983 | Fu et al. | 525/204 |
| 4,480,092 A | 10/1984 | Lai et al. | 544/198 |
| 4,629,752 A | 12/1986 | Layer et al. | 544/198 |
| 5,856,486 A | 1/1999 | Pickett et al. | 544/385 |
| 5,869,554 A | 2/1999 | Pickett et al. | 524/99 |
| 5,892,037 A | 4/1999 | Steinmann | 544/357 |
| 5,919,929 A | 7/1999 | Tomei | 544/198 |
| 5,925,758 A | 7/1999 | Pitteloud | 546/25 |

FOREIGN PATENT DOCUMENTS

| | | |
|---|---|---|
| CH | 577011 | 6/1976 |
| GB | 1411301 | 10/1975 |

OTHER PUBLICATIONS

Bull. Chem. Soc. JP, vol. 45, pp. 1855–1860 (1972).
Derwent Abstr. 85–95284 for CH 577011.
Chem. Abstr. 96:104191 (1981).
Chem. Abstr. 99:141068, (1983).
Makromol. Chem., Macromol. Symp. vol. 27, pp. 231–237, (1989).

*Primary Examiner*—Venkataraman Balasubramanian
(74) *Attorney, Agent, or Firm*—Kevin T. Mansfield

(57) ABSTRACT

Polyoxymethylene, blends of polycarbonate with acrylonitrile-butadiene-styrene terpolymer, and coatings based on a functional acrylate resin and a crosslinking agent, which are stabilized by addition of a compound of the formula I

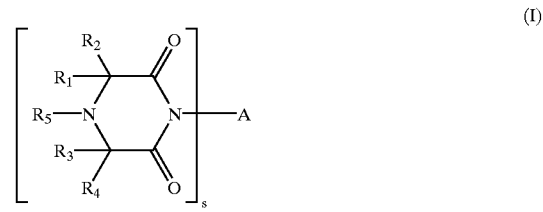

wherein s is from the range 1 to 8;

$R_1$, $R_2$, $R_3$ and $R_4$, independently of each other, are $C_1$–$C_4$alkyl, or $R_1$ and $R_2$ or $R_3$ and $R_4$, together with the carbon atom to which they are bound, form a cyclopentyl or cyclohexyl ring;

$R_5$ is hydrogen; $C_1$–$C_{18}$alkyl; oxyl; OH; $CH_2CN$; $C_1$–$C_{18}$alkoxy; $C_5$–$C_{12}$cycloalkoxy; $C_3$–$C_8$alkenyl; $C_3$–$C_8$alkynyl; $C_7$–$C_{12}$phenylalkyl; $C_7$–$C_{15}$phenylalkyl, which is substituted on the phenyl ring by 1, 2 or 3 radicals selected from $C_1$–$C_4$alkyl and $C_1$–$C_4$alkoxy; $C_7$–$C_{15}$phenylalkoxy; $C_7$–$C_{15}$phenylalkoxy, which is substituted on the phenyl ring by 1, 2 or 3 radicals selected from $C_1$–$C_4$alkyl and $C_1$–$C_4$alkoxy; or $R_5$ is $C_1$–$C_8$alkanoyl; $C_3$–$C_5$alkenoyl; $C_1$–$C_{18}$alkanoyloxy; glycidyl; or a group —$CH_2CH(OH)$-G, in which G is hydrogen, methyl or phenyl; and A is as described in claim 1, show a good resistance against harmful effects of light, oxygen and heat.

7 Claims, No Drawings

COMPOSITIONS STABILIZED BY DIOXOPIPERAZINYL DERIVATIVES

This is a continuation of application Ser. No. 09/826,404, filed Apr. 2, 2001, now abandoned, which is a continuation of application Ser. No. 09/315,703, filed on May 20, 1999, which is abandoned.

The invention relates to compositions based on polyoxymethylene, blends of polycarbonate with acrylonitrile-butadiene-styrene terpolymer, or functional acrylate resin and crosslinking agent, which are stabilized by addition of a compound of the class of 3,3,5,5-tetraalkyl-piperazin-2,6-dione, new compounds of this class, the use of the novel compounds as stabilizers for organic material against harmful effects of light, oxygen and/or heat, and organic material stabilized correspondingly.

Structure and numbering of of 3,3,5,5-tetraalkyl-piperazin-2,6-dione is as shown in the formula:

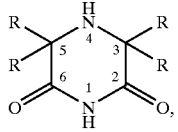

with R being alkyl.

Preparation of some of the above compounds, specific derivatives thereof, and use of these compounds as stabilizers e.g. for polyethylene, polypropylene, nylon or ABS is shown by T. Yoshioka et al., Bull. Chem. Soc. Jap. 45, 1855–1860 (1972); Luston and Vass, Makromol. Chem., Macromol. Symp. (1989), 27; and in the documents U.S. Pat. No. 4,413,096; C.A.99:141068; C.A.96:104191; U.S. Pat. No. 3,969,316; U.S. Pat. No. 3,936,456; U.S. Pat. No. 3,928,357; U.S. Pat. No. 3,928,330; US-A-3920659; U.S. Pat. No. 3,919,234.

It has now been found, that certain compounds of the 3,3,5,5-tetraalkyl-piperazin-2,6-dione class are especially well suitable as stabilizers for polyoxymethylene, blends of polycarbonate with acrylonitrile-butadiene-styrene terpolymer, or coatings based on a functional acrylate resin and a crosslinking agent.

The invention therefore pertains to a composition comprising (A) a synthetic organic polymer selected from the group consisting of polyoxymethylene, a blend of polycarbonate with acrylonitrile-butadiene-styrene terpolymer, and a coating system based on a functional acrylate resin and a crosslinking agent, and (B) as stabilizer a compound of the formula I or II

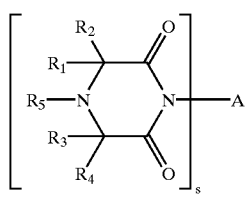 (I)

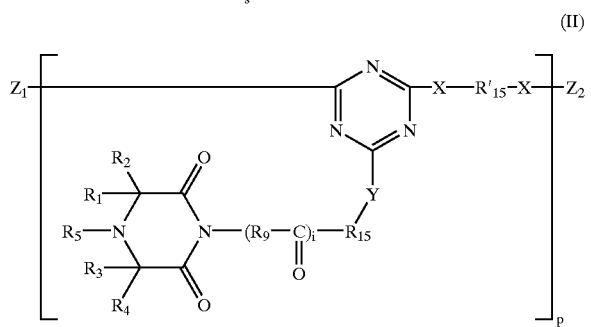 (II)

wherein p is from the range 1 to 10;

s is from the range 1 to 8;

when s is 1,

A is $C_1$–$C_{18}$alkyl; $C_2$–$C_{18}$alkyl which is substituted by $NH_2$, hydroxy, halogen and/or $OR_{10}$ or interrupted by —O—, —NH— and/or —$NR_{10}$—; or A is $C_1$–$C_{18}$alkyl substituted by —$COOR_{11}$ or phenyl;

when s is 2,

A is $C_2$–$C_{10}$alkylene; $C_4$–$C_{12}$alkenylene; $C_3$–$C_{15}$alkylene substituted by one or more OH and/or interrupted by one or more oxygen, phenylene, $C_1$–$C_4$alkylphenylene, —COO—, —CONH—,

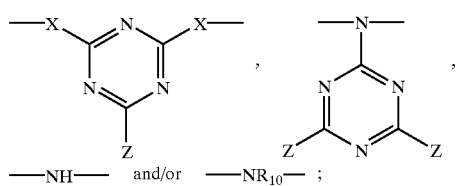

—NH— and/or —$NR_{10}$— ;

when s is 3,

A is $C_3$–$C_{10}$alkantriyl; $C_3$–$C_{12}$alkantriyl substituted by OH and/or interrupted by oxygen, —NH— or —$NR_{10}$—; or one of the groups of the formulae (IIIa)–(IIId)

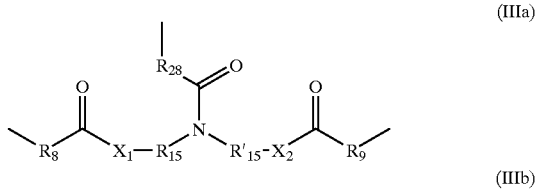 (IIIa)

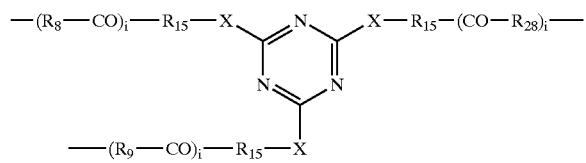 (IIIb)

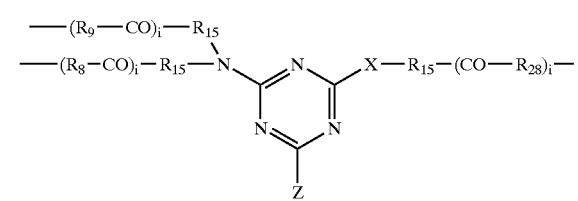 (IIIc)

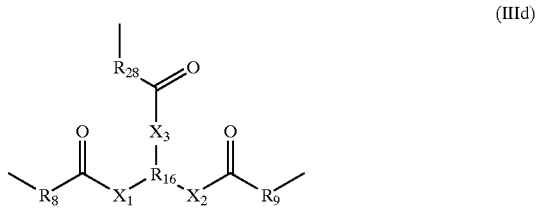 (IIId)

when s is 4,

A is $C_4$–$C_{10}$alkantetryl; $C_4$–$C_{12}$alkantetryl substituted by OH and/or interrupted by oxygen, —NH— or —$NR_{10}$—; or one of the groups of the formulae (IVa)–(IVd)

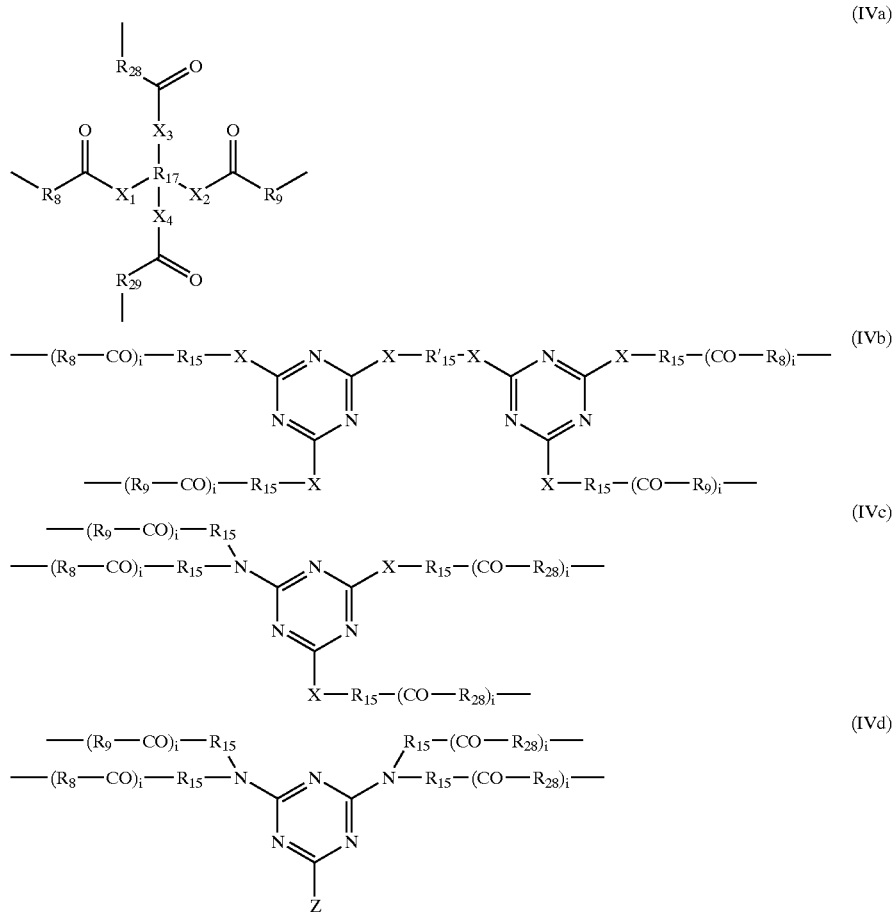
when s is 5,
A is C$_5$–C$_{10}$alkanepentayl; C$_5$–C$_{12}$alkanepentayl substituted by OH and/or interrupted by oxygen, —NH— or —NR$_{10}$—; or one of the groups of the formulae (Va)–(Vc)
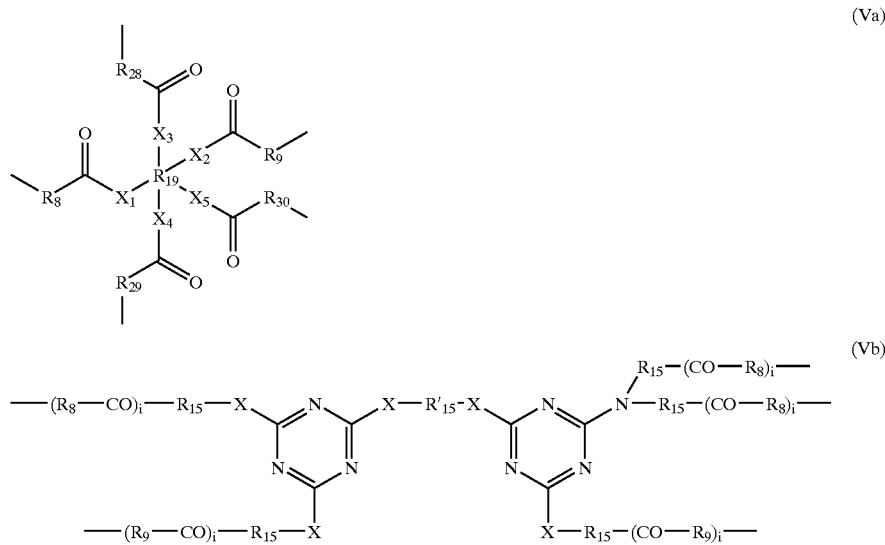

-continued
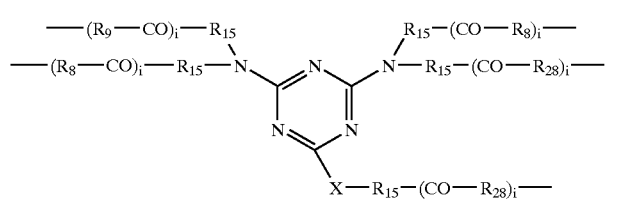
(Vc)
when s is 6,
A is $C_6$–$C_{10}$alkanehexayl; $C_6$–$C_{12}$alkanehexayl substituted by OH and/or interrupted by oxygen, —NH— or —$NR_{10}$—; or one of the groups of the formulae (VIa)–(VIf)
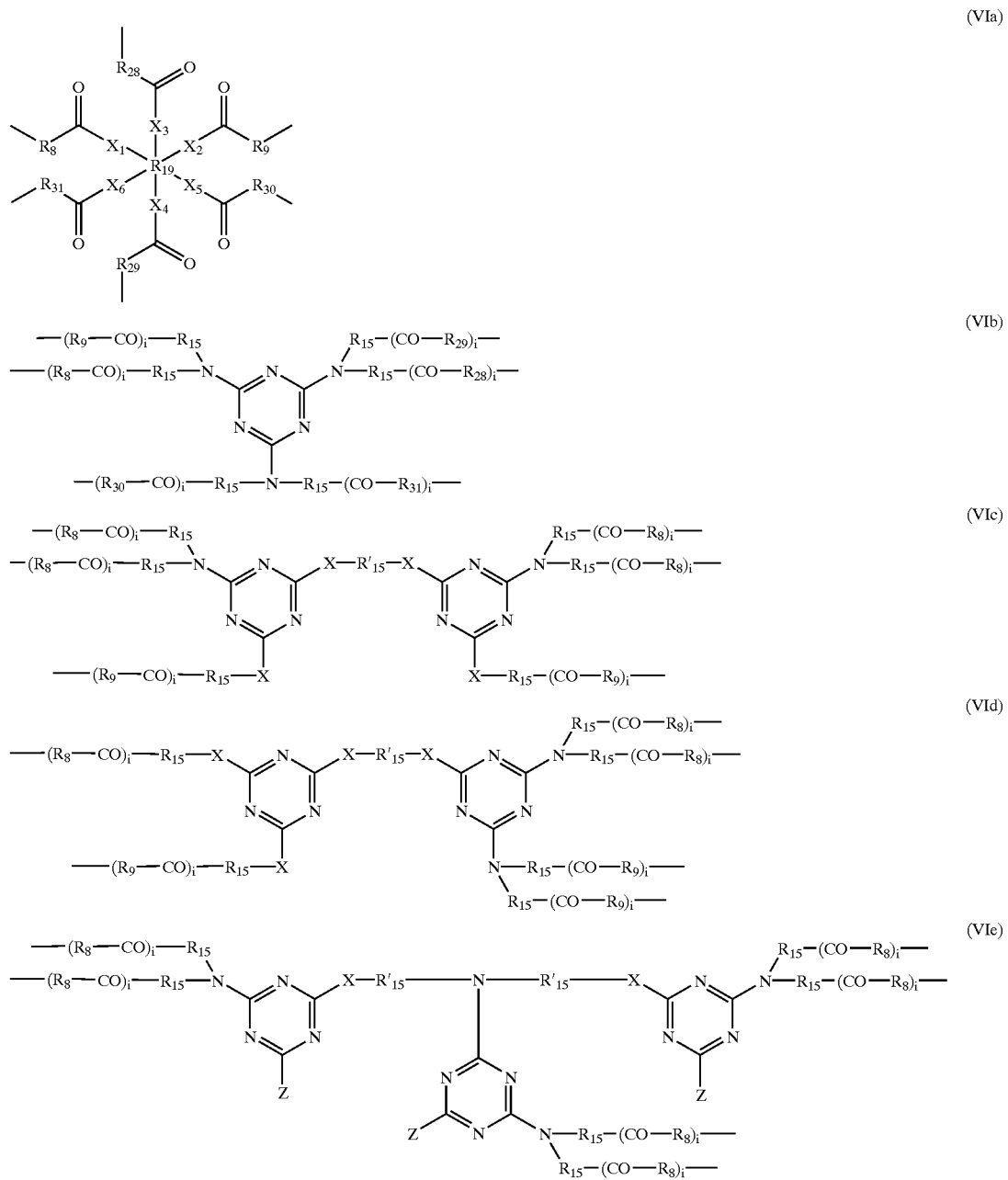

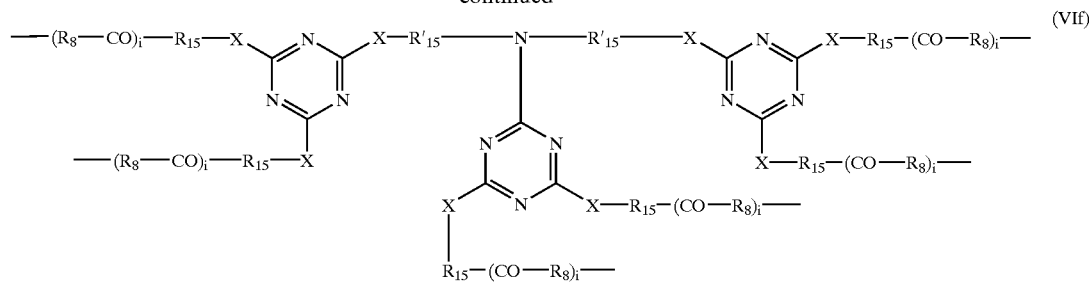
(VIf)
when s is 7,
A is $C_7$–$C_{10}$alkaneheptayl; $C_7$–$C_{12}$alkaneheptayl substituted by OH and/or interrupted by oxygen, —NH— or —$NR_{10}$—; or one of the groups of the formulae (VIIa)–(VIId)
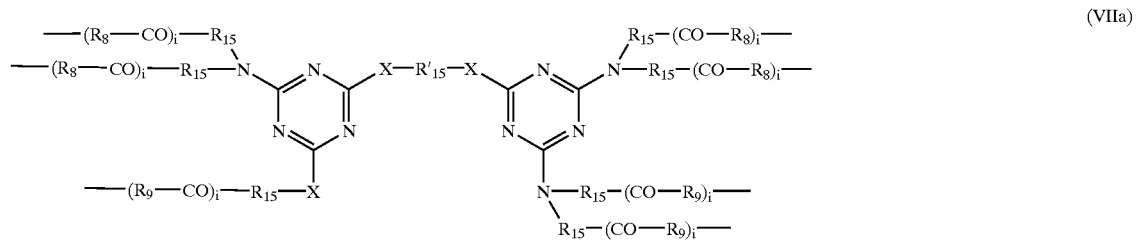
(VIIa)
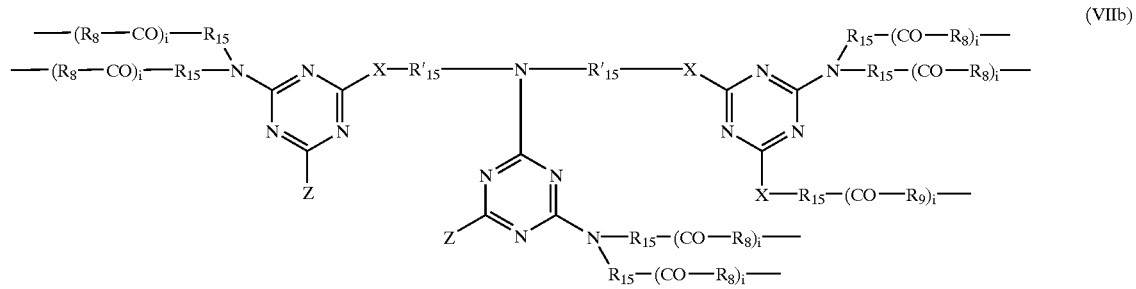
(VIIb)
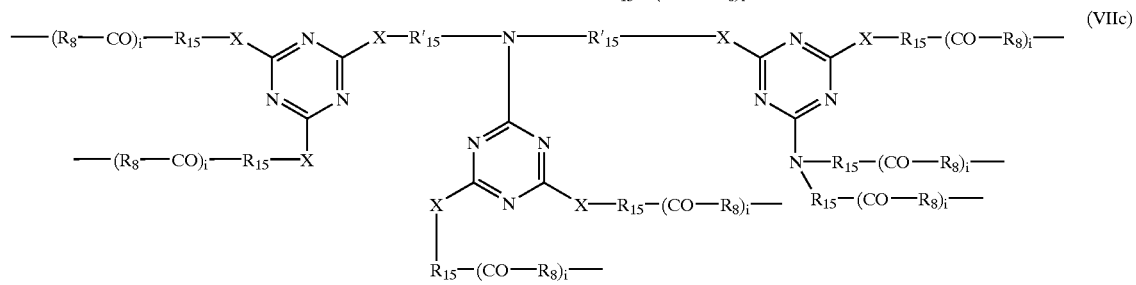
(VIIc)
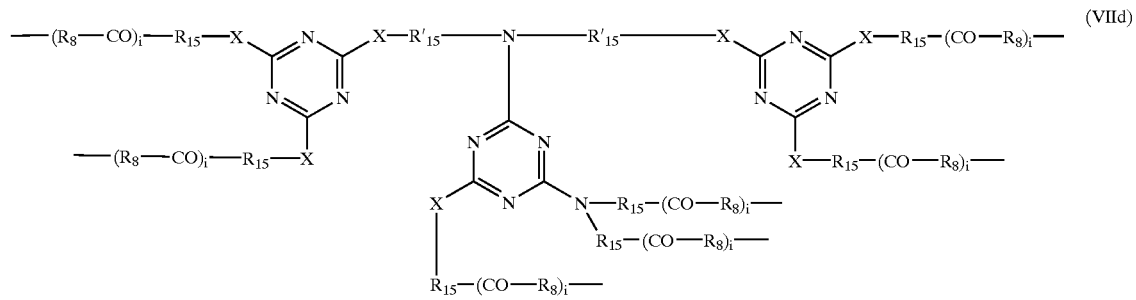
(VIId)

when s is 8,

A is $C_8$–$C_{10}$alkaneoctayl; $C_8$–$C_{12}$alkaneoctayl substituted by OH and/or interrupted by oxygen, —NH— or —$NR_{10}$—; or one of the groups of the formulae (VIIIa)–(VIIIb)

$R_{16}$ is $C_3$–$C_{10}$alkantriyl; $C_3$–$C_{12}$alkantriyl substituted by OH and/or interrupted by oxygen, —NH— or —$NR_{10}$—;

$R_{17}$ is $C_4$–$C_{10}$alkantetryl; $C_4$–$C_{12}$alkantetryl substituted by OH and/or interrupted by oxygen, —NH— or —$NR_{10}$—;

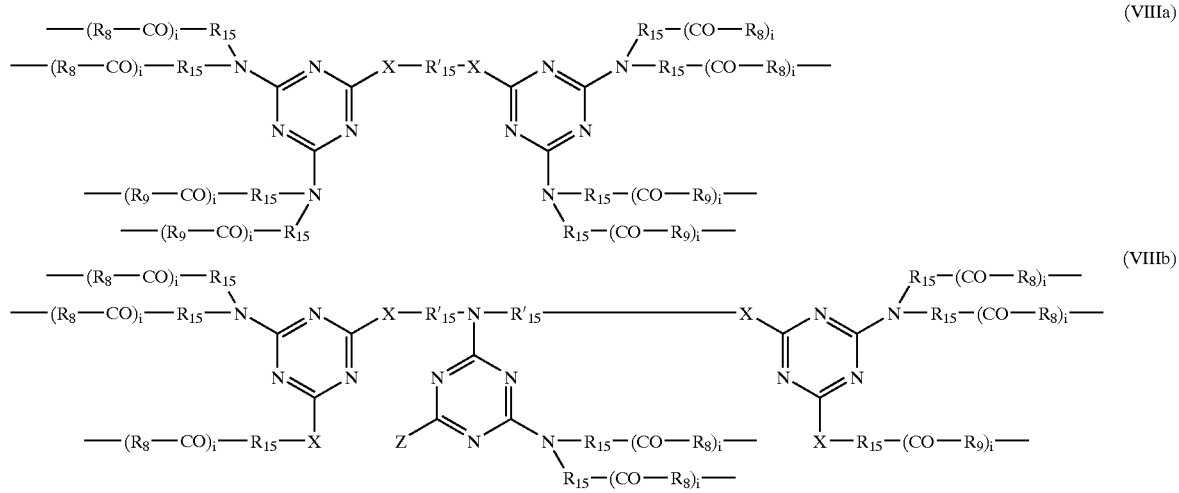

the index i is zero or 1;

$R_1$, $R_2$, $R_3$ and $R_4$, independently of each other, are $C_1$–$C_4$alkyl, or $R_1$ and $R_2$ or $R_3$ and $R_4$, together with the carbon atom to which they are bound, form a cyclopentyl or cyclohexyl ring;

$R_5$ is hydrogen; $C_1$–$C_{18}$alkyl; oxyl; OH; $CH_2CN$; $C_1$–$C_{18}$alkoxy; $C_5$–$C_{12}$cycloalkoxy; $C_3$–$C_8$alkenyl; $C_3$–$C_8$alkynyl; $C_7$–$C_{12}$phenylalkyl; $C_7$–$C_{15}$phenylalkyl, which is substituted on the phenyl ring by 1, 2 or 3 radicals selected from $C_1$–$C_4$alkyl and $C_1$–$C_4$alkoxy; $C_1$–$C_{15}$phenylalkoxy; $C_1$–$C_{15}$phenylalkoxy, which is substituted on the phenyl ring by 1, 2 or 3 radicals selected from $C_1$–$C_4$alkyl and $C_1$–$C_4$alkoxy; or $R_5$ is $C_1$–$C_8$alkanoyl; $C_3$–$C_5$alkenoyl; $C_1$–$C_{18}$alkanoyloxy; glycidyl; or a group —$CH_2CH(OH)$-G, in which G is hydrogen, methyl or phenyl;

$R_8$ and $R_9$, and $R_{28}$, $R_{29}$, $R_{30}$, $R_{31}$, $R_{32}$ and $R_{33}$, independently of each other, are $C_1$–$C_4$alkylene;

$R_{10}$ is $C_1$–$C_8$alkyl, $C_1$–$C_8$alkanoyl, $C_5$–$C_{12}$cycloalkyl, $C_7$–$C_{15}$phenylalkyl which is unsubstituted or substituted on the phenyl ring by a radical selected from $C_1$–$C_4$alkyl and $C_1$–$C_4$alkoxy; or $R_{10}$ is $C_1$–$C_8$alkyl or $C_1$–$C_8$alkanoyl substituted by OH, $C_1$–$C_{12}$alkoxy and/or a residue benzophenonyl or benzophenonyloxy, wherein one or both phenyl rings of the benzophenone moiety are unsubstituted or substituted by OH, halogen, $C_1$–$C_4$alkyl and/or $C_1$–$C_{18}$alkoxy;

$R_{11}$ is $C_1$–$C_{18}$alkyl; $C_2$–$C_{18}$alkyl which is substituted by $NH_2$, $NHR_{10}$, $N(R_{10})_2$, nitro, hydroxy and/or $C_1$–$C_{18}$alkoxy; $C_3$–$C_{18}$alkenyl; $C_5$–$C_{12}$cycloalkyl; $C_5$–$C_{12}$cycloalkyl which is substituted by $C_1$–$C_4$alkyl and/or interrupted by —O—;

$R_{12}$, $R_{13}$ and $R_{14}$, independently of each other, are $C_2$–$C_{10}$alkylene; $C_3$–$C_{12}$alkylene substituted by OH and/or interrupted by oxygen, phenylene, $C_1$–$C_4$alkylphenylene, —NH— or —$NR_{10}$—; $C_4$–$C_{12}$alkenylene;

$R_{15}$ and $R'_{15}$, independently of each other, are is $C_2$–$C_{10}$alkylene; $C_3$–$C_{12}$alkylene substituted by OH and/or interrupted by oxygen, phenylene, $C_1$–$C_4$alkylphenylene, —NH— or —$NR_{10}$—;

$R_{18}$ is $C_5$–$C_{10}$alkanepentayl; $C_5$–$C_{12}$alkanepentayl substituted by OH and/or interrupted by oxygen, —NH— or —$NR_{10}$—;

$R_{19}$ is $C_6$–$C_{10}$alkanehexayl; $C_6$–$C_{12}$alkanehexayl substituted by OH and/or interrupted by oxygen, —NH— or —$NR_{10}$—;

X is —O—, —NH— or —$N(R_{10})$—;

$X_1$, $X_2$, $X_3$, $X_4$, $X_5$, $X_6$, $X_7$ and $X_8$, independently of each other, are —O— or —NH—;

Y is —O— or a residue of the formula

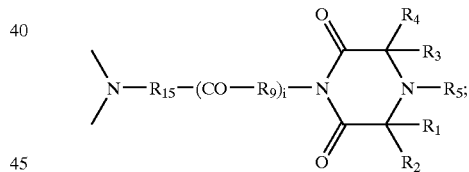

Z stands for halogen, $NH_2$, $NHR_{10}$, $N(R_{10})_2$ or $C_1$–$C_4$alkoxy;

$Z_1$ has one of the meanings given for Z or is —X—$R'_{15}$—XH and $Z_2$ is H or a residue of the formula

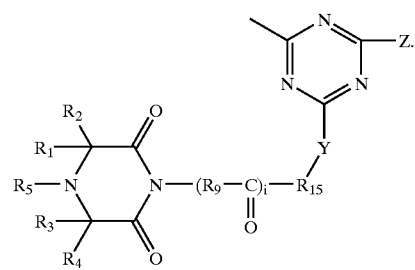

Where one compound carries more than one group denoted with the same symbol, these groups may be the same or different within their defined meanings.

Alkylene, cycloalkylene or alkenylene residues may be bonded on different carbon atoms or on the same carbon atom thus embracing alkylidene, cycloalkylidene and alkenylidene, respectively.

All residues, where appropriate, may be straight chain or branched unless otherwise indicated. Hetero atoms are non-carbon atoms, for instance N, O, S or P atoms. Alkyl or alkylene interrupted by hetero groups such as oxygen or cycloalkylene may be interrupted by one or more of these groups as long as no linkages of the type O—O, O—N etc. occur.

The index s is the valency of A; for example, A as alkyl is a monovalent, A as alkylene a divalent, A as alkanetriyl a trivalent, A as alkanetetryl a tetravalent, A as alkanepentayl a pentavalent, A as alkanehexayl a hexavalent, A as alkaneheptayl a heptavalent, and A as alkaneoctayl an octovalent saturated hydrocarbon residue. A residue which is interrupted is interrupted in a carbon—carbon single bond. A residue which is interrupted and/or substituted may be a residue interrupted in one or more carbon—carbon single bonds by one or more divalent interrupting groups, a residue substituted by one or more monovalent substituents, or a residue which is both interrupted in one or more carbon—carbon single bonds by one or more divalent interrupting groups and substituted by one or more monovalent substituents.

Thus, examples for A as $C_3$–$C_{15}$alkylene substituted by one or more OH and/or interrupted by oxygen, phenylene, $C_1$–$C_4$alkylphenylene, —COO—, —CONH—, —NH— or —$NR_{10}$— include groups of the formulae $CH_2CH(OH)CH_2$, $CH_2$—$C(CH_2OH)_2$—$CH_2$, $(CH_2)_2$—N(CHO)—$(CH_2)_2$, $(CH_2)_2$—N H—$(CH_2)_2$, $(CH_2)_2$—O—$(CH_2)_2$, $(CH_2)_2$—O—$(CH_2)_2$—O—$(CH_2)_2$, $CH_2$—CO—O—$(CH_2)_2$—O—$(CH_2)_2$—O—CO—$CH_2$, $CH_2$—CO—O—$(CH_2)_6$—O—CO—$CH_2$, $CH_2$—CO—O—$(CH_2)_2$—O—CO—$CH_2$.

Halogen is preferably chloro or bromo, especially chloro.

$C_6$–$C_{12}$aryl is preferably phenyl or naphthyl, especially phenyl.

The compounds of the invention can be pure or mixtures of compounds.

$R_1$, $R_2$, $R_3$, $R_4$, $R_5$, $R_{10}$ as alkyl are, within the definitions given, for example methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl or octadecyl.

$R_8$, $R_9$, $R_{12}$, $R_{13}$, $R_{14}$, $R_{15}$, $R'_{15}$ and $R_{28}$–$R_{33}$ as alkylene are, within the definitions given, for example methylene, 1,2-ethylene, 1,1-ethylene, 1,3-propylene, 1,2-propylene, 1,1-propylene, 2,2-propylene, 1,4-butylene, 1,3-butylene, 1,2-butylene, 1,1-butylene, 2,2-butylene, 2,3-butylene, or —$C_5H_{10}$—, —$C_6H_{12}$—, $C_7H_{14}$, —$C_8H_{16}$—, —$C_9H_{18}$—, —$C_{10}H_2O$—, —$C_{11}H_{22}$—, —$C_{12}H_{24}$—, —$C_{13}H_{26}$—, —$C_{14}H_{28}$—, —$C_{15}H_{30}$—, —$C_{16}H_{32}$—, —$C_{17}H_{34}$-, —$C_{18}H_{36}$—.

$R_8$, $R_9$ and $R_{28}$–$R_{33}$ are especially preferred as methylene.

In $R_5$, $R_{10}$, $R_{11}$ as $C_5$–$C_{12}$cycloalkyl or cycloalkoxy, the cycloalkyl part is, for example, cyclopentyl, cyclohexyl, cycloheptyl, cyclooctyl, cyclononyl, cyclodecyl, cycloundecyl or cyclododecyl. $C_5$–$C_{12}$-Cycloalkenyl includes cyclopentenyl, cyclohexenyl, cycloheptenyl, cyclooctenyl, cyclononenyl, cyclodecenyl, cycloundecenyl, cyclododecenyl.

$C_1$–$C_4$alkyl or akloxy substituted cycloalkyl or phenyl (containing mainly 1–3, e.g. 1 or 2 alkyl groups) include inter alia 2- or 4-methylcyclohexyl, dimethylcyclohexyl, trimethylcyclohexyl, t-butylcyclohexyl, methylphenyl, methoxyphenyl, dimethylphenyl.

Phenylalkyl or phenylalkoxy are alkyl or alkoxy each of which is substituted by phenyl. $R_5$, $R_{10}$ as phenylalkyl or phenylalkoxy are, within the definitions given, for example benzyl, benzyloxy, α-methylbenzyl, α-methylbenzyloxy, cumyl, cumyloxy.

$R_5$ and $R_{10}$ as alkanoyl are, for example, formyl, acetyl, propionyl, butyryl, pentanoyl, octanoyl; $R_5$ as alkanoyl is preferred as $C_2$–$C_8$alkanoyl, especially acetyl.

Residues alkenoyl, such as in the definition of $R_5$, are most preferably acryloyl or methacryloyl.

Residues alkenyl, such as in the definition of $R_5$, are most preferably allyl.

X is preferably NH; $X_1$–$X_6$ are most preferably O; Z is most preferred as $N(R_{10})_2$; i is most preferred as zero.

The index p is preferably from the range 2–6.

A preferred blend of polycarbonate with acrylonitrile-butadiene-styrene terpolymer (component (A) of the above composition) is a blend of 10 to 90 parts by weight of polycarbonate with 90 to 10 parts by weight of acrylonitrile-butadiene-styrene terpolymer.

Polycarbonates contained in these blends are to be understood as being especially those polymers the constitutional repeating unit of which corresponds to the formula

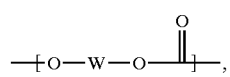

wherein W is a divalent phenolic radical. Examples of W are given inter alia in U.S. Pat. No. 4,960,863 and DE-A-3922496. W can be derived, for example, from hydroquinone, resorcinol, dihydroxybiphenylene or bisphenols in the broadest sense of the term, such as bis (hydroxyphenyl)alkanes, cycloalkanes, sulfides, ethers, ketones, sulfones, sulfoxides, α,α'-bis(hydroxyphenyl) diisopropylbenzenes, for example the compounds 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane, or from the bisphenols of the formulae

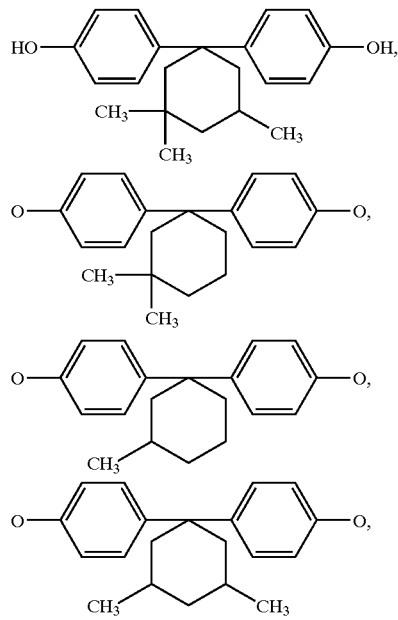

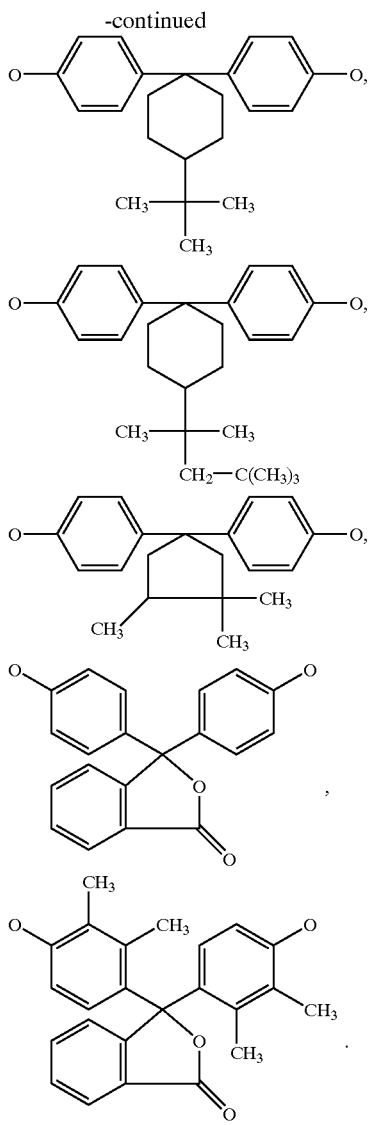

The composition of the invention preferably contains as further component (C) a UV absorber from the class of the benzotriazoles, o-hydroxyphenyl-s-triazines and/or benzophenones, examples of which are listed below.

Preferred is composition, wherein in the compound of formula I (component B)

s is from the range 2 to 6;
when s is 2
A is $C_2$–$C_{10}$alkylene; $C_3$–$C_{12}$alkylene substituted by OH and/or interrupted by oxygen, —NH— or —NR$_{10}$—; or a group of the formula —R$_8$—COO—R$_{12}$—OCO—R$_9$— (IIa);

when s is 3,
A is a group of the formula (IIIa)

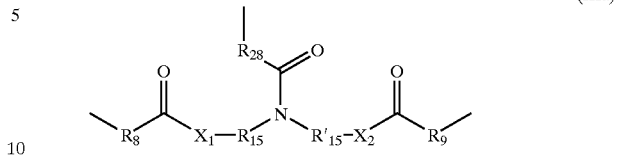

(IIIa)

when s is 4,
A is one of the groups of the formulae (IVa) or (IVd)

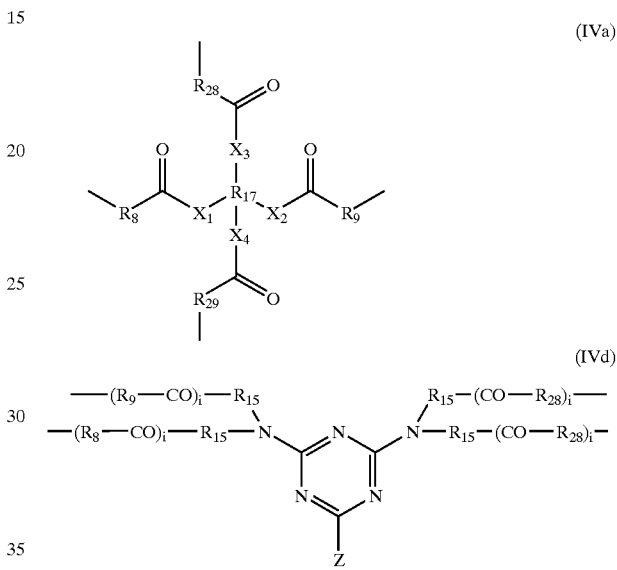

(IVa)

(IVd)

when s is 5,
A is a group of the formula (Va)

(Va)

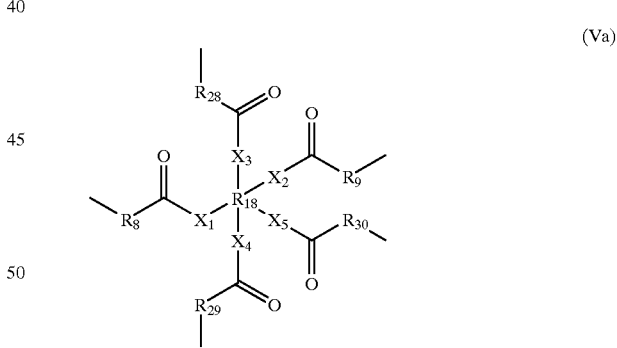

when s is 6,
A is one of the groups of the formulae (VIb)–(VIf)

(VIb)

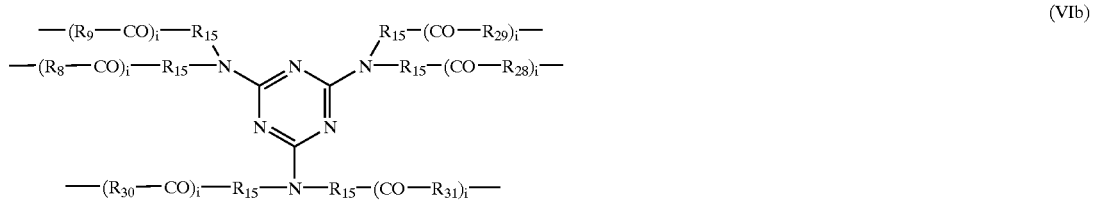

-continued

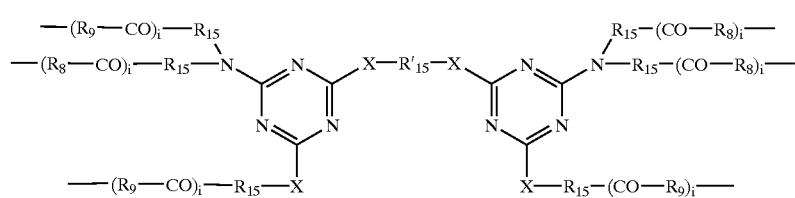
(VIc)

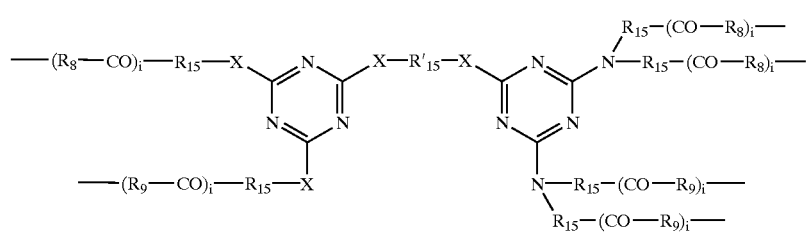
(VId)

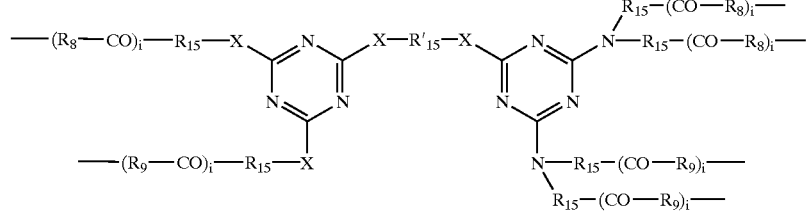
(VIe)

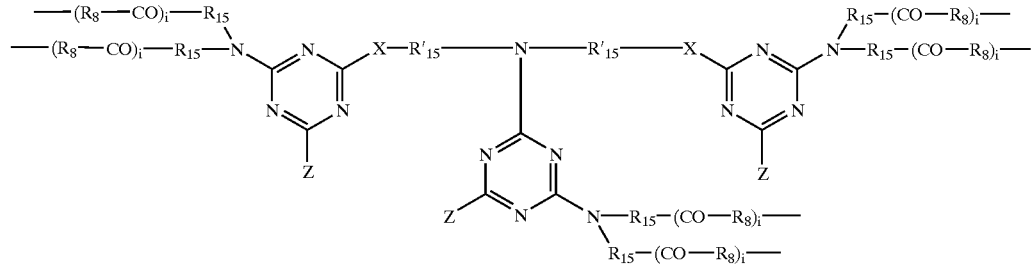
(VIf)

the index i is zero or 1;

$R_1$, $R_2$, $R_3$ and $R_4$, independently of each other, are methyl;

$R_5$ is hydrogen; $C_1$–$C_{18}$alkyl; oxyl; OH; $C_1$–$C_{18}$alkoxy; $C_5$–$C_{12}$cycloalkoxy; $C_3$–$C_8$alkenyl; or $R_5$ is $C_1$–$C_8$alkanoyl; $C_3$–$C_5$alkenoyl; $C_1$–$C_{18}$alkanoyloxy; glycidyl; or a group —$CH_2CH(OH)$—G, in which G is hydrogen, methyl or phenyl;

$R_8$ and $R_9$, and $R_{28}$, $R_{29}$, $R_{30}$, $R_{31}$, $R_{32}$ and $R_{33}$, independently of each other, are methylene;

$R_{10}$ is $C_1$–$C_8$alkyl, $C_1$–$C_8$alkanoyl, $C_5$–$C_{12}$cycloalkyl;

$R_{12}$ is $C_2$–$C_{10}$alkylene; or $C_3$–$C_{12}$alkylene interrupted by oxygen, —NH— or —$NR_{10}$—;

$R_{15}$ and $R'_{15}$, independently of each other, are is $C_2$–$C_{10}$alkylene;

$R_{17}$ is $C_4$–$C_{10}$alkantetryl;

$R_{18}$ is $C_5$–$C_{10}$alkanepentayl;

X is —O—, —NH— or —$N(R_0)$—;

$X_1$, $X_2$, $X_3$, $X_4$, $X_5$, $X_6$, $X_7$ and $X_8$, independently of each other, are —O— or —NH—; and Z stands for $NHR_{10}$, $N(R_{10})_2$ or $C_1$–$C_4$alkoxy.

Many compounds of the above component B are novel. The invention therefore also relates to a compound of the formula (I') or (II)

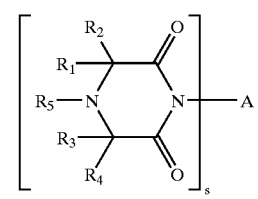
(I')

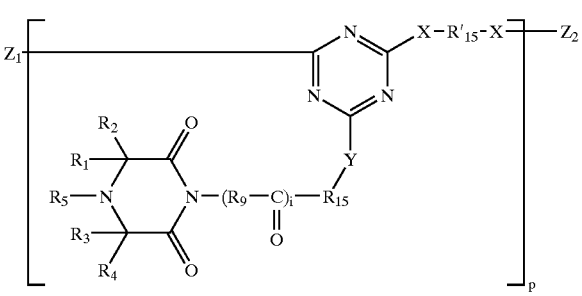
(II)

wherein p is from the range 1–10;

s is from the range 1 to 8, preferably 2 to 8;

$R_1$, $R_2$, $R_3$ and $R_4$, independently of each other, are $C_1$–$C_4$alkyl;

$R_5$ is hydrogen; $C_1$–$C_{18}$alkyl; oxyl; OH; $CH_2CN$; $C_1$–$C_{18}$alkoxy; $C_5$–$C_{12}$cycloalkoxy; $C_3$–$C_3$alkenyl; $C_3$–$C_8$alkynyl; $C_7$–$C_{12}$phenylalkyl; $C_7$–$C_{15}$phenylalkyl, which is substituted on the phenyl ring by 1, 2 or 3 radicals selected from $C_1$–$C_4$alkyl and $C_1$–$C_4$alkoxy; $C_7$–$C_{15}$phenylalkoxy; $C_7$–$C_{15}$phenylalkoxy, which is substituted on the phenyl ring by 1, 2 or 3 radicals selected from $C_1$–$C_4$alkyl and $C_1$–$C_4$alkoxy; or $R_5$ is $C_1$–$C_8$alkanoyl; $C_3$–$C_5$alkenoyl; $C_1$–$C_{18}$alkanoyloxy; glycidyl; or a group —$CH_2CH(OH)$-G, in which G is hydrogen, methyl or phenyl;

when s is 1, A is $C_2$–$C_{18}$alkylene substituted by $OR_{30}$, wherein $R_{30}$ is $C_1$–$C_8$alkyl or $C_1$–$C_8$alkanoyl substituted by a residue benzophenonyl or benzophenonyloxy, wherein one or both phenyl rings of the benzophenone moiety are unsubstituted or substituted by OH, halogen, $C_1$–$C_4$alkyl and/or $C_1$–$C_{18}$alkoxy;

when s is 2

A is $C_3$–$C_{15}$alkylene substituted by one or more OH and/or interrupted by one or more oxygen, phenylene, $C_1$–$C_4$alkylphenylene, —COO—, —CONH—,

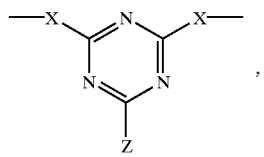

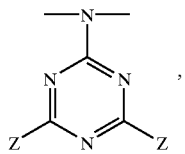

—NH— and/or —$NR_{10}$—; or A is $C_4$–$C_{12}$alkenylene;
and when $R_5$ is not hydrogen, A also embraces $C_2$–$C_{10}$alkylene; $C_2$–$C_{10}$alkylene interrupted by phenylene or $C_1$–$C_4$alkylphenylene;

when s is 3,
A is $C_3$–$C_{10}$alkantriyl; $C_3$–$C_{12}$alkantriyl substituted by OH and/or interrupted by oxygen, —NH— or —$NR_{10}$—; or one of the groups of the formulae (IIIa)–(IIId)

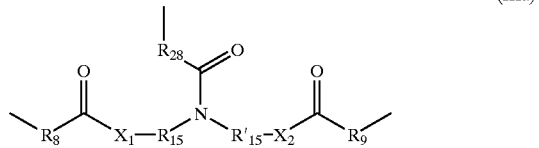
(IIIa)

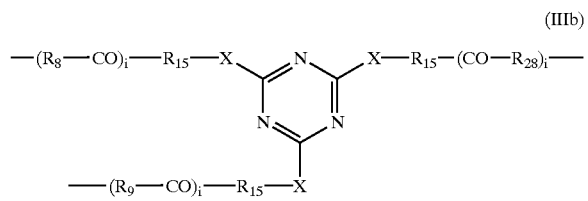
(IIIb)

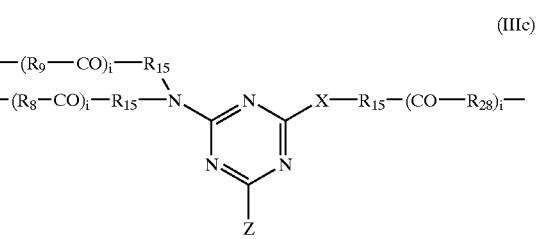
(IIIc)

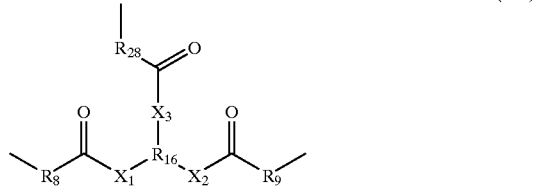
(IIId)

when s is 4,
A is $C_4$–$C_{10}$alkantetryl; $C_4$–$C_{12}$alkantetryl substituted by OH and/or interrupted by oxygen, —NH— or —$NR_{10}$—; or one of the groups of the formulae (IVa)–(IVd)

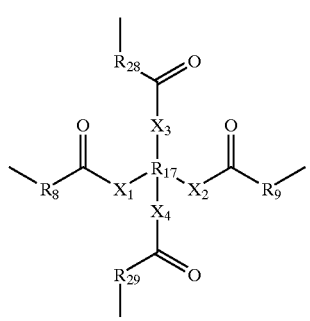
(IVa)

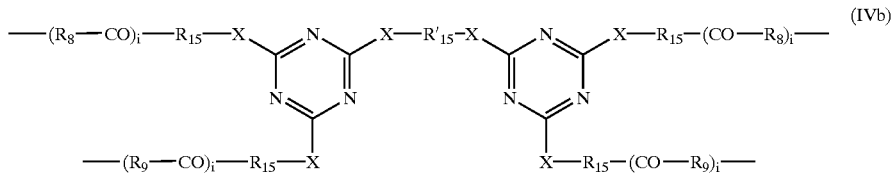
(IVb)

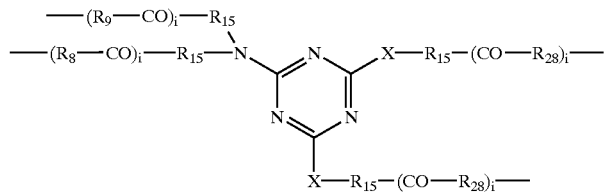
(IVc)
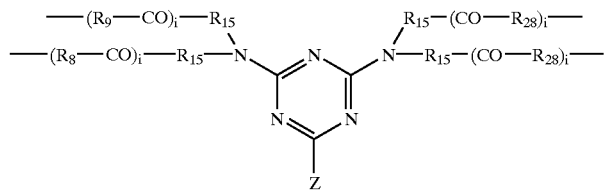
(IVd)
when s is 5,
A is $C_5$–$C_{10}$alkanepentayl; $C_5$–$C_{12}$alkanepentayl substituted by OH and/or interrupted by oxygen, —NH— or —$NR_{10}$—; or one of the groups of the formulae (Va)–(Vc)
when s is 6,
A is $C_6$–$C_{10}$alkanehexayl; $C_6$–$C_{12}$alkanehexayl substituted by OH and/or interrupted by oxygen, —NH— or —$NR_{10}$—; or one of the groups of the formulae (VIa)–(VIf)
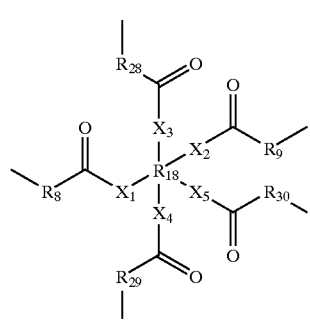
(Va)
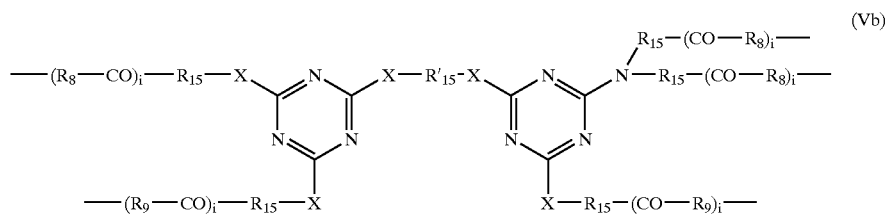
(Vb)
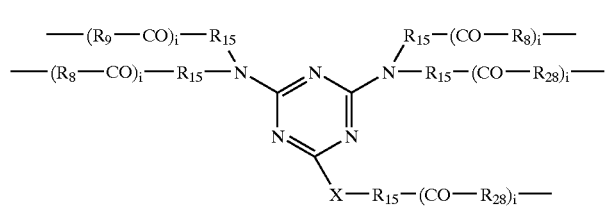
(Vc)

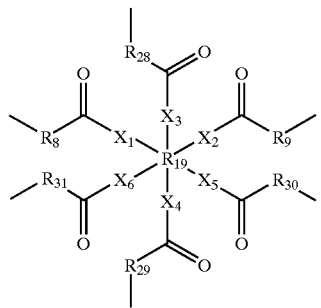
(VIa)
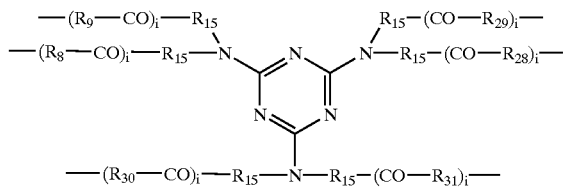
(VIb)
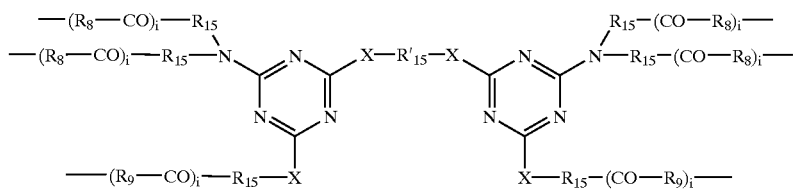
(VIc)
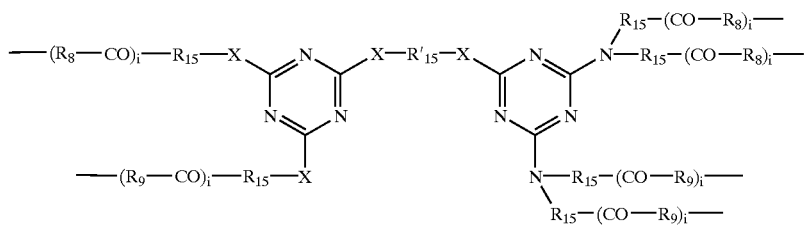
(VId)
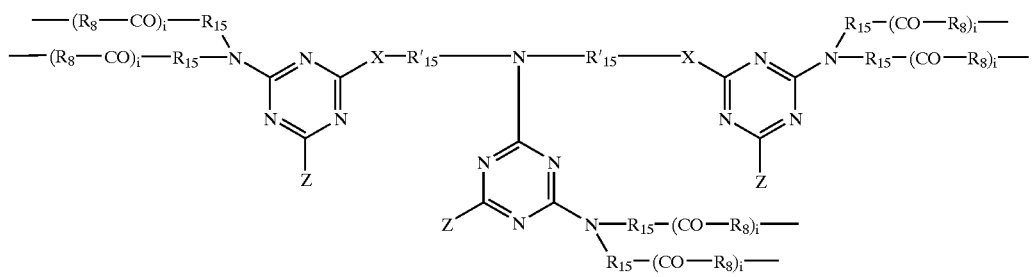
(VIe)
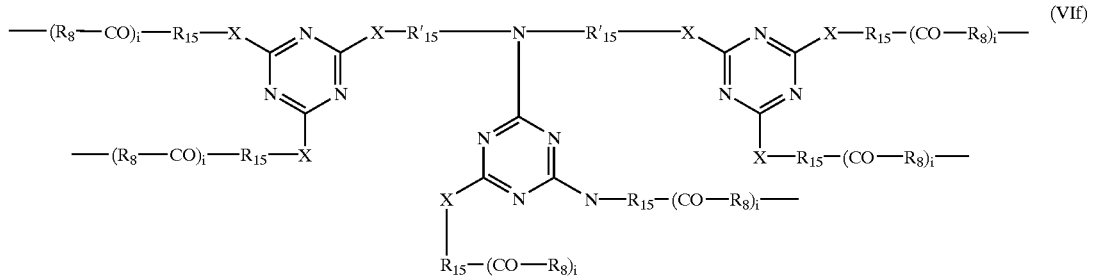
(VIf)

when s is 7,
A is $C_7$–$C_{10}$alkaneheptayl; $C_7$–$C_{12}$alkaneheptayl substituted by OH and/or interrupted by oxygen, —NH— or —$NR_{10}$—; or one of the groups of the formulae (VIIa)–(VIId)
when s is 8,
A is $C_8$–$C_{10}$alkaneoctayl; $C_8$–$C_{12}$alkaneoctayl substituted by OH and/or interrupted by oxygen, —NH— or —$NR_{10}$—; or one of the groups of the formulae (VIIIa)–(VIIIb)
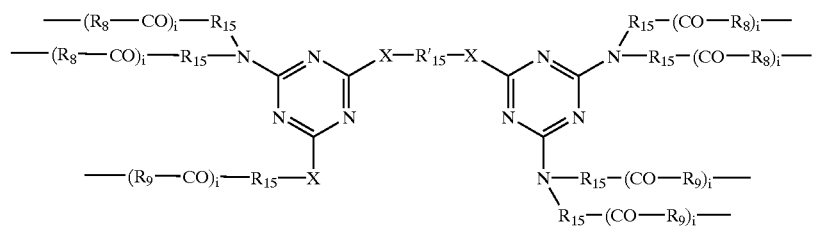
(VIIa)
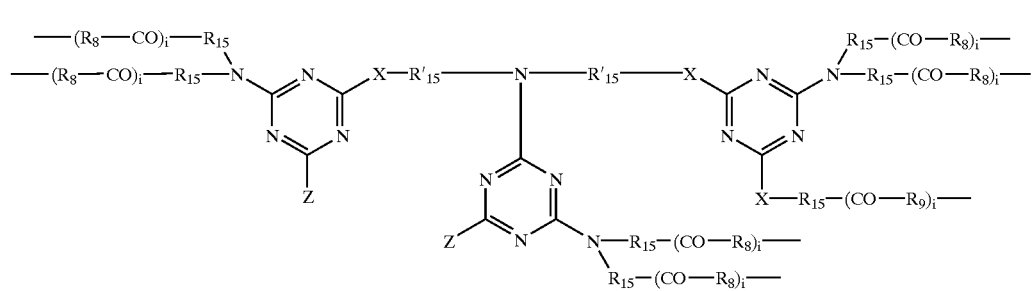
(VIIb)
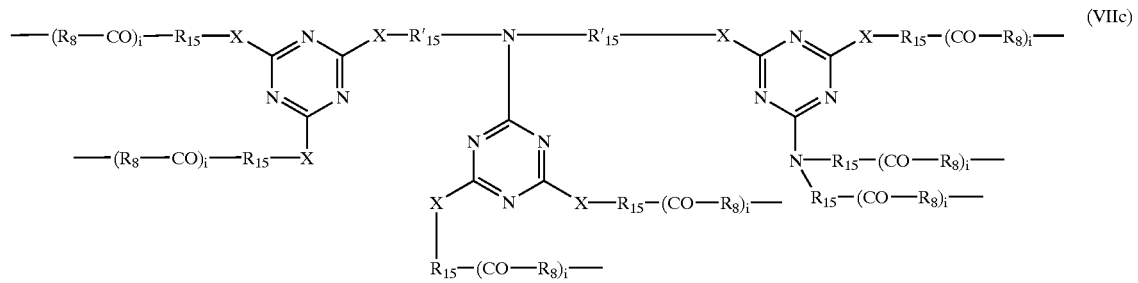
(VIIc)
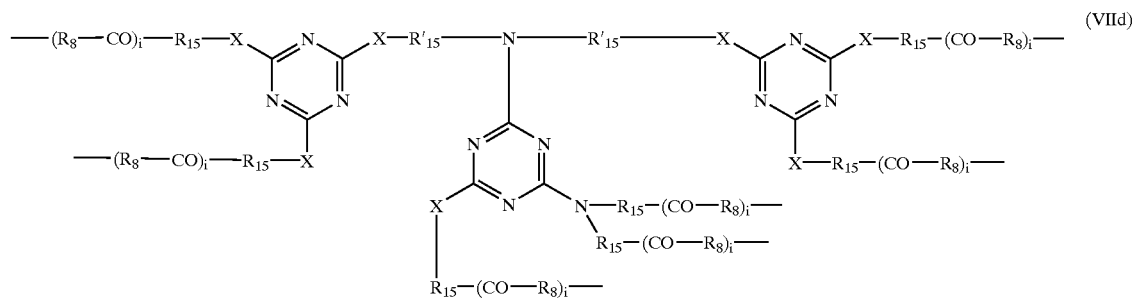
(VIId)
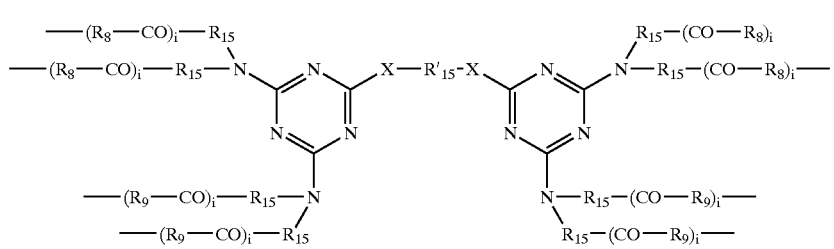
(VIIIa)

(VIIIb)

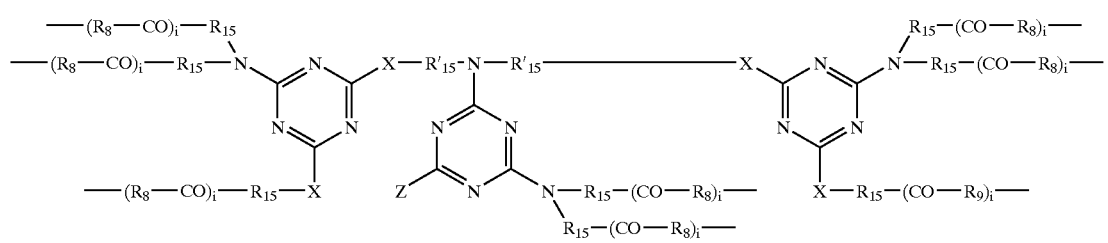

the index i is zero or 1;

$R_8$ and $R_9$, and $R_{28}$, $R_{29}$, $R_{30}$, $R_{31}$, $R_{32}$ and $R_{33}$, independently of each other, are methylene, and when $R_5$ is not hydrogen, additionally embrace ethylene;

$R_{10}$ is $C_1-C_8$alkyl, $C_1-C_8$alkanoyl, $C_5-C_{12}$cycloalkyl, $C_7-C_{15}$phenylalkyl which is unsubstituted or substituted on the phenyl ring by a radical selected from $C_1-C_4$alkyl and $C_1-C_4$alkoxy;

$R_{12}$, $R_{13}$ and $R_{14}$, independently of each other, are $C_2-C_{10}$alkylene; $C_3-C_{12}$alkylene substituted by OH and/or interrupted by oxygen, phenylene, $C_1-C_4$alkylphenylene, —NH— or —$NR_{10}$—; $C_4-C_{12}$alkenylene;

$R_{15}$ and $R'_{15}$, independently of each other, are $C_2-C_{10}$alkylene; $C_3-C_{12}$alkylene substituted by OH and/or interrupted by oxygen, phenylene, $C_1-C_4$alkylphenylene, —NH— or —$NR_{10}$—;

$R_{16}$ is $C_3-C_{10}$alkantriyl; $C_3-C_{12}$alkantriyl substituted by OH and/or interrupted by oxygen, —NH— or —$NR_{10}$—;

$R_{17}$ is $C_4-C_{10}$alkantetryl; $C_4-C_{12}$alkantetryl substituted by OH and/or interrupted by oxygen, —NH— or —$NR_{10}$—;

$R_{18}$ is $C_5-C_{10}$alkanepentayl; $C_5-C_{12}$alkanepentayl substituted by OH and/or interrupted by oxygen, —NH— or —$NR_{10}$—;

$R_{19}$ is $C_6-C_{10}$alkanehexayl; $C_6-C_{12}$alkanehexayl substituted by OH and/or interrupted by oxygen, —NH— or —$NR_{10}$—;

X is —O—, —NH— or —$N(R_{10})$—;

$X_1$, $X_2$, $X_3$, $X_4$, $X_5$, $X_6$, independently of each other, are —O— or —NH—;

Y is —O— or a residue of the formula

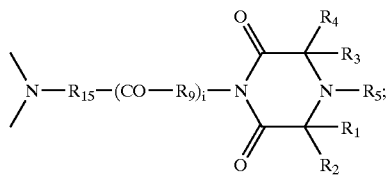

Z stands for halogen, $NH_2$, $NHR_{10}$, $N(R_{10})_2$ or $C_1-C_4$alkoxy;

$Z_1$ has one of the meanings given for Z or is —X—$R'_{15}$—XH and $Z_2$ is H or a residue of the formula

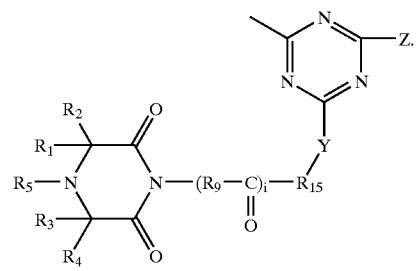

Preferred meanings in the formula (I') include those given above for formula (I), where appropriate.

Also preferred is a compound of the formula (I') or (II) wherein p is from the range 2–6, s is from the range 2 to 8; $R_1$, $R_2$, $R_3$ and $R_4$, independently of each other, are methyl or ethyl;

$R_5$ is hydrogen; $C_1-C_{18}$alkyl; oxyl; OH; $CH_2CN$; $C_1-C_{18}$alkoxy; $C_5-C_{12}$cycloalkoxy; $C_3-C_8$alkenyl; $C_7-C_{12}$phenylalkyl; $C_7-C_{15}$phenylalkoxy; or $R_5$ is $C_1-C_6$alkanoyl; $C_3-C_5$alkenoyl; $C_1-C_{18}$alkanoyloxy; glycidyl; or a group —$CH_2CH(OH)$-G, in which G is hydrogen, methyl or phenyl;

when s is 2

A is $C_3-C_{12}$alkylene substituted by OH and/or interrupted by oxygen, —NH— or —$NR_{10}$—; $C_4-C_{12}$alkenylene; or one of the groups of the formulae (IIa)–(IIe)

 (IIa)

 (IIb)

 (IIc)

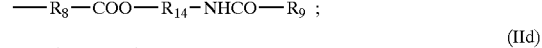 (IId)

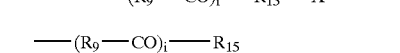 (IIe)

and when $R_5$ is not hydrogen, A also embraces $C_2-C_{10}$alkylene; $C_2-C_{10}$alkylene interrupted by phenylene or $C_1-C_4$alkylphenylene;

when s is 3,

A is $C_3$–$C_{10}$alkantriyl; or one of the groups of the formulae (IIIa)–(IIId)
(IIIa)
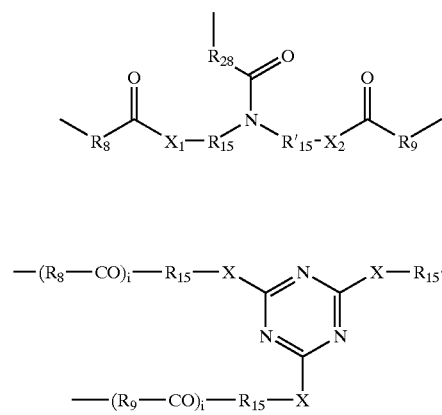
(IIIb)
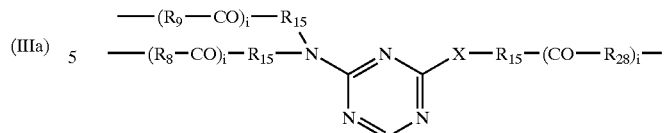
(IIIc)
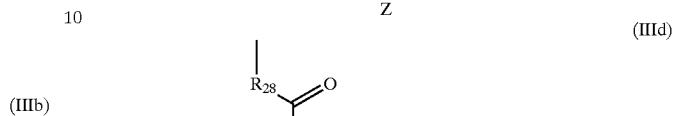
(IIId)
when s is 4,
A is $C_4$–$C_{10}$alkantetryl; or one of the groups of the formulae (IVa)–(IVd)
(IVa)
(IVb)
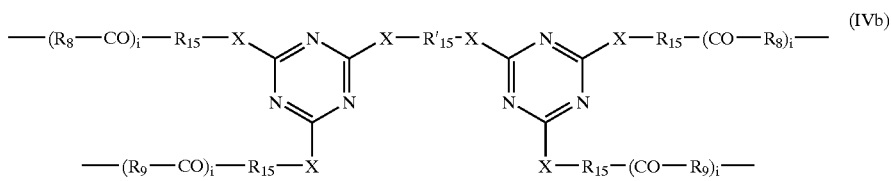
(IVc)
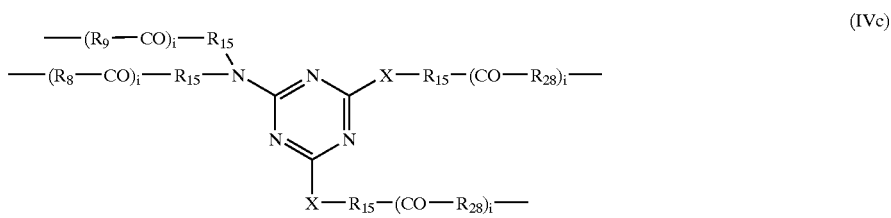
(IVd)
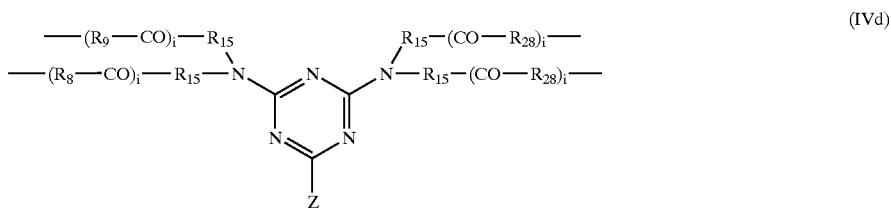

when s is 5,
A is $C_5$–$C_{10}$alkanepentayl; or a group of the formula (Va)
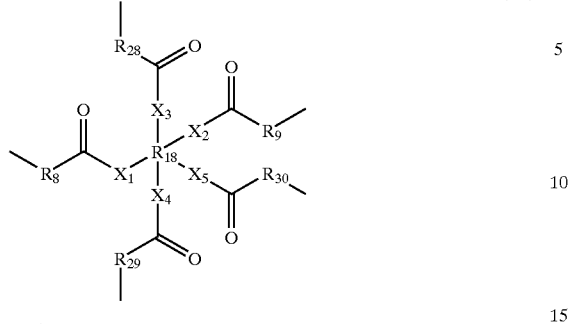
(Va)
when s is 6,
A is $C_6$–$C_{10}$alkanehexayl; or one of the groups of the formulae (VIb)–(VIf)
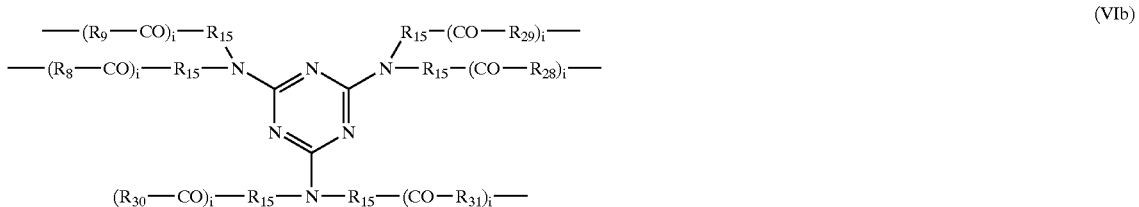
(VIb)
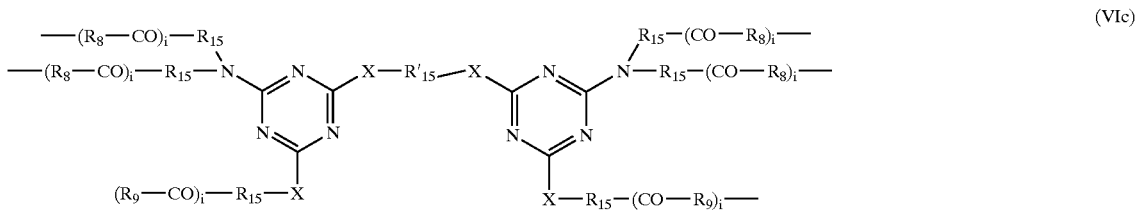
(VIc)
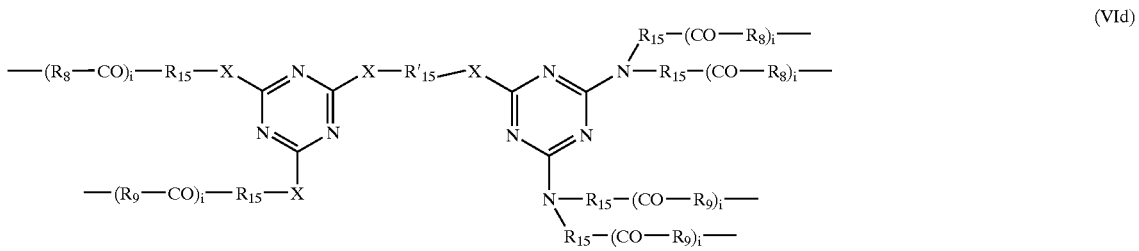
(VId)
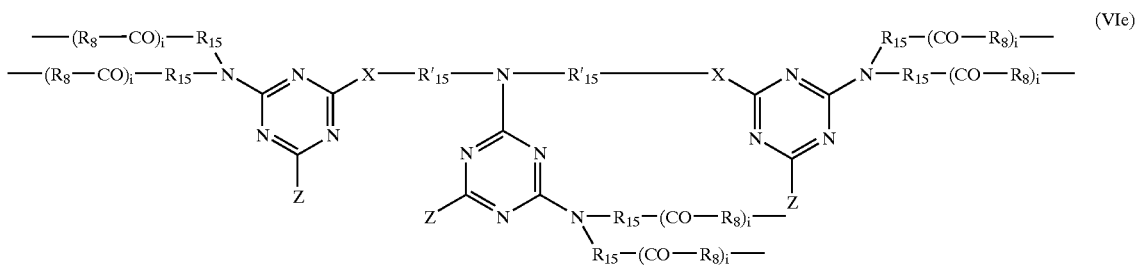
(VIe)
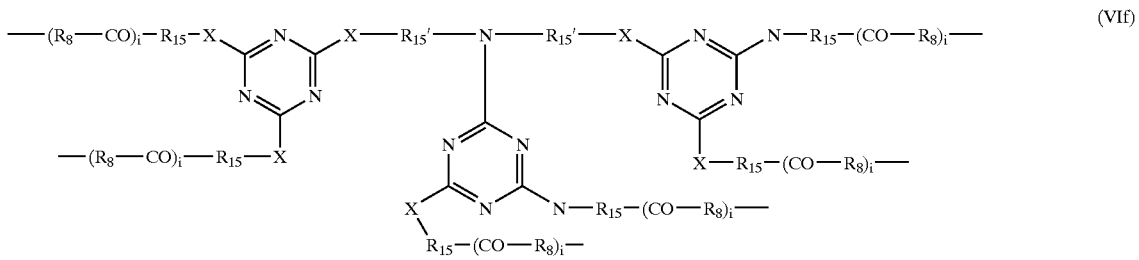
(VIf)

when s is 7,
A is $C_7$–$C_{10}$alkaneheptayl;
when s is 8,
A is $C_8$–$C_{10}$alkaneoctayl; or one of the groups of the formulae (VIIIa)–(VIIIb);
the index i is zero or 1;
$R_8$ and $R_9$, and $R_{28}$, $R_{29}$, $R_{30}$, $R_{31}$, $R_{32}$ and $R_{33}$, independently of each other, are methylene;
$R_{10}$ is $C_1$–$C_8$alkyl, $C_1$–$C_8$alkanoyl, $C_5$–$C_{12}$cycloalkyl, $C_7$–$C_{15}$phenylalkyl;
$R_{12}$, $R_{13}$ and $R_{14}$, independently of each other, are $C_2$–$C_{10}$alkylene; $C_3$–$C_{12}$alkylene substituted by OH and/or interrupted by oxygen, —NH— or —$NR_{10}$—; $C_4$–$C_{12}$alkenylene;
$R_{15}$ and $R'_{15}$, independently of each other, are is $C_2$–$C_{10}$alkylene; $C_3$–$C_{12}$alkylene substituted by OH and/or interrupted by oxygen, phenylene, $C_1$–$C_4$alkylphenylene, —NH— or —$NR_{10}$—;
$R_{16}$ is $C_3$–$C_{10}$alkantriyl;
$R_{17}$ is $C_4$–$C_{10}$alkantetryl;
$R_{18}$ is $C_5$–$C_{10}$alkanepentayl;
X is —O—, —NH— or —$N(R_{10})$—;
$X_1$, $X_2$, $X_3$, $X_4$, $X_5$, independently of each other, are —O— or —NH—; and
Z stands for halogen, $NH_2$, $NHR_{10}$, $N(R_{10})_2$ or $C_1$–$C_4$alkoxy.

Especially preferred is a compound of the formula (I') wherein s is from the range 2 to 6;
$R_1$, $R_2$, $R_3$ and $R_4$, independently of each other, are methyl or ethyl;
$R_5$ is hydrogen; $C_1$–$C_{18}$alkyl; oxyl; OH; $CH_2CN$; $C_1$–$C_{18}$alkoxy; $C_5$–$C_{12}$cycloalkoxy; $C_3$–$C_8$alkenyl; $C_7$–$C_{12}$phenylalkyl; $C_7$–$C_{15}$phenylalkoxy; or $R_5$ is $C_1$–$C_8$alkanoyl; $C_3$–$C_5$alkenoyl; $C_1$–$C_{18}$alkanoyloxy; glycidyl; or a group —$CH_2CH(OH)$-G, in which G is hydrogen, methyl or phenyl;
when s is 2
A is $C_3$–$C_{12}$alkylene substituted by OH and/or interrupted by oxygen, —NH— or —$NR_{10}$—; $C_4$–$C_{12}$alkenylene; or a group of the formula (IIa)

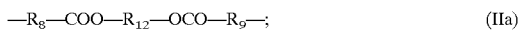
—$R_8$—COO—$R_{12}$—OCO—$R_9$—; (IIa)

and when $R_5$ is not hydrogen, A also embraces $C_2$–$C_{10}$alkylene;
when s is 3,
A is $C_3$–$C_{10}$alkantriyl; or one of the groups of the formulae (IIIa), (IIIb) or (IIId);
when s is 4,
A is $C_4$–$C_{10}$alkantetryl; or one of the groups of the formulae (IVa), (IVb) or (IVd);
when s is 5,
A is $C_5$–$C_{10}$alkanepentayl;
when s is 6,
A is one of the groups of the formulae (VIb)–(VIf);
the index i is zero or 1;
$R_8$ and $R_9$, and $R_{28}$, $R_{29}$, $R_{30}$, $R_{31}$, $R_{32}$ and $R_{33}$, independently of each other, are methylene;
$R_{10}$ is $C_1$–$C_8$alkyl, $C_1$–$C_8$alkanoyl, $C_5$–$C_{12}$cycloalkyl; $R_{12}$ is $C_2$–$C_{10}$alkylene; $C_3$–$C_{12}$alkylene substituted by OH and/or interrupted by oxygen, —NH— or —$NR_{10}$—;
$R_{15}$ and $R'_{15}$, independently of each other, are is $C_2$–$C_{10}$alkylene;
$R_{16}$ is $C_3$–$C_{10}$alkantriyl;
$R_{17}$ is $C_4$–$C_{10}$alkantetryl;
X is —O—, —NH— or —$N(R_{10})$—;
$X_1$, $X_2$, $X_3$, $X_4$, independently of each other, are —O— or —NH—; and Z stands for $NHR_{10}$ or $N(R_{10})_2$.

Most preferred is a compound of the formula (I') wherein s is 2, 3, 4 or 6;
$R_1$, $R_2$, $R_3$ and $R_4$ are methyl;
$R_5$ is hydrogen; $C_1$–$C_8$alkyl; $C_1$–$C_{18}$alkoxy; cyclohexyloxy; allyl; benzyl; acetyl; $C_3$–$C_4$alkenoyl; glycidyl;
when s is 2
A is $C_3$–$C_{10}$alkylene substituted by OH or interrupted by oxygen, —NH— or —$NR_{10}$—; or a group of the formula —$R_8$—COO—$R_{12}$—OCO—$R_9$— (IIa);
and when $R_5$ is not hydrogen, A also embraces $C_2$–$C_{10}$alkylene;
when s is 3, A is a group of the formula (IIIa);
when s is 4, A is a group of the formula (IVa) or (IVd);
when s is 6, A is a groups of the formula (VIe);
the index i is zero;
$R_8$ and $R_9$, and $R_{28}$, $R_{29}$, $R_{30}$, $R_{31}$, $R_{32}$ and $R_{33}$ are methylene;
$R_{10}$ is $C_1$–$C_8$alkyl, formyl, acetyl, or cyclohexyl;
$R_{12}$ is $C_2$–$C_{10}$alkylene; or $C_3$–$C_{10}$alkylene interrupted by oxygen;
$R_{15}$ and $R'_{15}$, independently of each other, are is $C_2$–$C_{10}$alkylene;
$R_{17}$ is $C_4$–$C_{10}$alkantetryl;
X is —NH—;
$X_1$, $X_2$, $X_3$, $X_4$ are —O—; and
Z stands for $N(R_{10})_2$.

The preparation of compounds of the formula I or I' can start from the compound 3,3,5,5-tetraalkyl-piperazin-2,6-dione and can follow or be carried out in analogy to methods described in the documents cited on page 1 or standard procedures described in textbooks of organic chemistry; examples for such methods are alkylation, (trans) esterification or etherification, substitution etc.

Compounds thus obtained may be further derivatized by applying suitable synthetic methods known in the art, e.g. in analogy to methods described in EP-A-375612, U.S. Pat. No. 5,204,473, U.S. Pat. No. 5,004,770, and Kurumada et al., J. Polym. Sci., Poly. Chem. Ed. 23,1477 (1985), as well as U.S. Pat. No. 5,449,776, example 8, and publications cited therein, for the modification of piperidine derivatives.

The novel compounds of present invention can be employed with advantage for stabilizing organic material against the damaging effect of light, oxygen and/or heat. They are notable for high substrate compatibility and good persistence in the substrate.

Examples of materials to be stabilized in accordance with the invention are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
   a) radical polymerisation (normally under high pressure and at elevated temperature).
   b) catalytic polymerisation using a catalyst that normally contains one or more than one metal of groups IVb, Vb, VIb or VII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,- trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The invention therefore also provides compositions comprising

A) an organic material which is sensitive to oxidative, thermal and/or actinic degradation, and B) at least one compound of the formula I', and provides for the use of compounds of the formula I' for stabilizing organic material against oxidative, thermal or actinic degradation.

Effects of degradation inter alia may be discoloration, molecular breakdown or buildup. Thus, the invention likewise embraces a method of stabilizing organic material against thermal, oxidative and/or actinic breakdown/buildup, which comprises applying or adding at least one compound of the formula I' to this material.

In general, the compounds of the formula I or I' are added to the material to be stabilized in amounts of from 0.1 to 10%, preferably from 0.01 to 5%, in particular from 0.01 to 2% (based on the material to be stabilized). Particular preference is given to the use of the novel compounds in amounts of from 0.05 to 1.5%, especially from 0.1 to 0.5%.

In addition to the compounds of the formula I or I', the novel compositions may as additional component C comprise one or more conventional additives such as, for example, those indicated below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydrocuinones, for example 2,6-di-tert-butyl-4-methoxyphenol, 2,5-di-tert-butylhydroquinone, 2,5-di-tert-amylhydroquinone, 2,6-diphenyl-4-octa-decyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis (2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5- methyl-phenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl) butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy benzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of D-(3,5-di-tert-butyl-4-hydroxyphenyl) prolionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of P-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of D-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of B-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenlenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguamide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono-und dialkylated tert-butyldiphenylamines, 2,3-dihydro-3,3-dimethyl-4H-1,4-benzothiazine, phenothiazine, a mixture of mono-und dialkylated tert-butyl/tert-octylphenothiazines, a mixture of mono-und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1.2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-β-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-ditert-butoxanilide, mixtures of o- and p-methoxy-disubstituted oxanilides and mixtures of o- and p-ethoxy-disubstituted oxanilides.

2.8. 2-(2-Hydroxyphenyl)-1.3.5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl) phosphite (Irgafos®168, Ciba-Geigy), tris(nonylphenyl) phosphite,

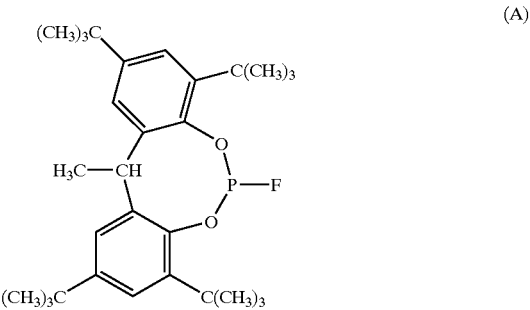
(A)

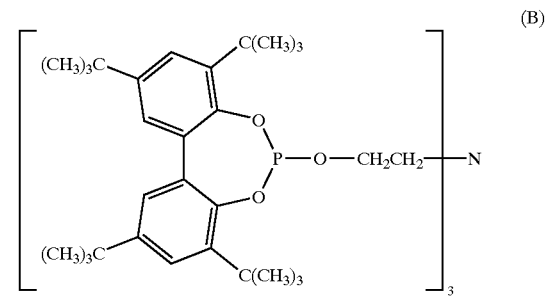
(B)

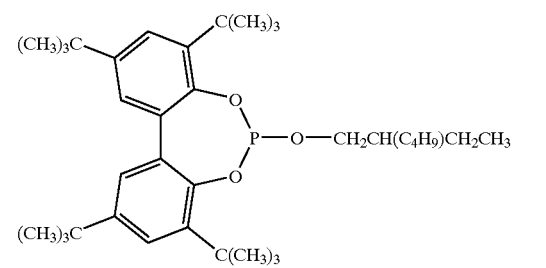
(C)

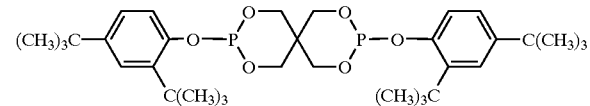
(D)

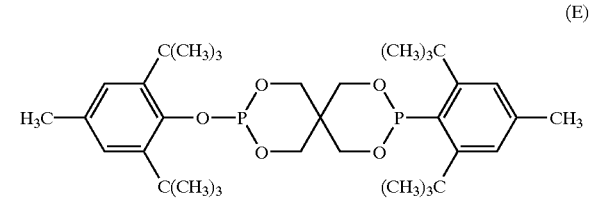
(E)

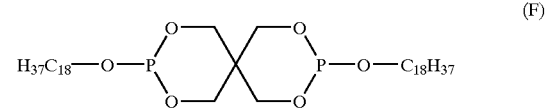
(F)

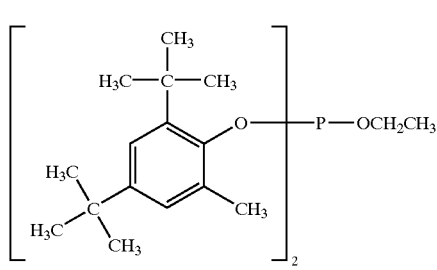

(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The conventional additives are judiciously employed in amounts of 0.1–10% by weight, for example 0.2–5% by weight, based on the material to be stabilized.

Costabilizers optionally to be added to the stabilizer mixture of the invention are preferably further light stabilizers, for instance those of the 2-hydroxyphenyl-benztriazole, 2-hydroxyphenyl-triazine, benzophenone or oxalanilide classes, e.g. as described in EP-A-453396, EP-A-434608, U.S. Pat. No. 5,298,067, WO 94/18278, GB-A-2297091 and WO 96/28431, and/or further hindered amines derived from 2,2,6,6-tetraalkylpiperidine containing at least one group of the formula

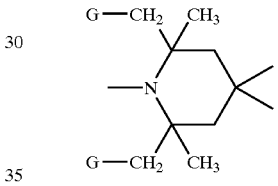

in which G is hydrogen or methyl, especially hydrogen; examples of tetraalkylpiperidine derivatives which can be used as costabilizers with mixtures of the invention are given in EP-A-356 677, pages 3–17, sections a) to f). These sections of this EP-A are regarded as part of the present description.

Especially preferred as costabilizers are 2-hydroxyphenyl-benztriazoles and/or 2-hydroxyphenyl-triazines.

Of particular interest is the use of compounds of the formula I' as stabilizers in synthetic organic polymers, especially thermoplastic polymers, and corresponding compositions, in film forming binders for coatings and in reprographic material.

The organic materials to be protected are preferably natural, semisynthetic or, preferably, synthetic organic materials. Particular preference is given to synthetic organic polymers or mixtures of such polymers, especially thermoplastic polymers such as polyolefins, especially polyethylene and polypropylene (PP), and coating compositions. Of special importance are also polycarbonates and blends thereof, for example the polymers listed above under items 19 and 28.

Incorporation into the materials can be effected, for example, by mixing in or applying the compounds of the formula I' and, if desired, further additives by the methods which are customary in the art. Where polymers are involved, especially synthetic polymers, incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the compounds of the formula I' into polymers is to add them before, during or directly after the polymerization of the corresponding monomers or prior to crosslinking. In this context the compound of the formula can be added as it is or else in encapsulated form (for example in waxes, oils or polymers). In the case of addition prior to or during the polymerization, the compounds of the formula I' can also act as a regulator of the chain length of the polymers (chain terminator).

The compounds of the formula I or I' can also be added in the form of a masterbatch containing said compound in a concentration, for example, of from 2.5 to 25% by weight to the polymers that are to be stabilized.

The compounds of the formula I or I' can judiciously be incorporated by the following methods:
- as emulsion or dispersion (e.g. to latices or emulsion polymers),
- as a dry mixture during the mixing in of additional components or polymer mixtures,
- by direct introduction into the processing apparatus (e.g. extruders, internal mixers, etc),
- as solution or melt.

Novel polymer compositions can be employed in various forms and/or processed to give various products, for example as (to give) films, fibres, tapes, moulding compositions, profiles, or as binders for coating materials, adhesives or putties.

Other materials to be stabilized according to the invention are recording materials. By such materials are meant, for example, those described in Research Disclosure 1990, 31429 (pages 474–480) for photographic reproduction and other reprographic techniques.

The novel recording materials comprise, for example, those for pressure-sensitive copying systems, microcapsule photocopier systems, heat-sensitive copier systems, photographic material and ink-jet printing.

The novel photographic material can be a black and white or a colour photographic material; colour photographic material is preferred. Further details on the structure of colour photographic material, and the components which can be employed in the novel material, can be found, inter alia, in U.S. Pat. No. 5,538,840, column 27, line 25, to column 106, line 16, and in the publications cited therein; these passages of U.S. Pat. No. 5,538,840 are hereby incorporated by reference. Application of the novel stabilizers of the formula I' is essentially as described for UV absorbers or hindered amine stabilizers in this reference.

Further important components, especially couplers, are described in U.S. Pat. No. 5,578,437. Likewise of particular interest is the use of the novel mixtures comprising compounds of the formula (I) as stabilizers for coatings, for example for paints. The invention therefore also relates to those compositions whose component (A) is a film-forming binder for coatings. The novel coating composition preferably comprises 0.01–10 parts by weight of (B), in particular 0.05–10 parts by weight of (B), especially 0.1–5 parts by weight of (B), per 100 parts by weight of solid binder (A).

Multilayer systems are possible here as well, where the concentration of the novel stabilizer (component (B)) in the outer layer can be relatively high, for example from 1 to 15 parts by weight of (B), in particular 3–10 parts by weight of (B), per 100 parts by weight of solid binder (A).

The use of the compounds of the formula I or I' in coatings is accompanied by the additional advantage that it prevents delamination, i.e. the flaking-off of the coating from the substrate. This advantage is particularly important in the case of metallic substrates, including multilayer systems on metallic substrates.

The binder (component (A)) can in principle be any binder which is customary in industry, for example those described in Ullmann's Encyclopedia of Industrial Chemistry, 5th edition, Vol. A18, pp. 368–426, VCH, Weinheim 1991. In general, it is a film-forming binder based on a thermoplastic or thermosetting resin, predominantly on a thermosetting resin. Examples thereof are alkyd, acrylic, polyester, phenolic, melamine, epoxy and polyurethane resins and mixtures thereof.

Component (A) can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p.469, VCH Verlagsgesellschaft, Weinheim 1991.

Preference is given to coating compositions in which component (A) is a binder comprising a functional acrylate resin and a crosslinking agent.

Examples of coating compositions containing specific binders are:

1. paints based on cold- or hot-crosslinkable alkyd, acrylate, polyester, epoxy or melamine resins or mixtures of such resins, if desired with addition of a curing catalyst;
2. two-component polyurethane paints based on hydroxyl-containing acrylate, polyester or polyether resins and aliphatic or aromatic isocyanates, isocyanurates or polyisocyanates;
3. one-component polyurethane paints based on blocked isocyanates, isocyanurates or polyisocyanates which are deblocked during baking, if desired with addition of a melamine resin;
4. one-component polyurethane paints based on a tris-alkoxycarbonyltriazine crosslinker and a hydroxyl group containing resin such as acrylate, polyester or polyether resins;
5. one-component polyurethane paints based on aliphatic or aromatic urethaneacrylates or polyurethaneacrylates having free amino groups within the urethane structure and melamine resins or polyether resins, if necessary with curing catalyst;
6. two-component paints based on (poly)ketimines and aliphatic or aromatic isocyanates, isocyanurates or polyisocyanates;
7. two-component paints based on (poly)ketimines and an unsaturated acrylate resin or a polyacetoacetate resin or a methacrylamidoglycolate methyl ester;
8. two-component paints based on carboxyl- or amino-containing polyacrylates and polyepoxides;
9. two-component paints based on acrylate resins containing anhydride groups and on a polyhydroxy or polyamino component;
10. two-component paints based on acrylate-containing anhydrides and polyepoxides;
11. two-component paints based on (poly)oxazolines and acrylate resins containing anhydride groups, or unsaturated acrylate resins, or aliphatic or aromatic isocyanates, isocyanurates or polyisocyanates;
12. two-component paints based on unsaturated polyacrylates and polymalonates;
13. thermoplastic polyacrylate paints based on thermoplastic acrylate resins or externally crosslinking acrylate resins in combination with etherified melamine resins;
14. paint systems based on siloxane-modified or fluorine-modified acrylate resins;

15. paint systems, especially for clearcoats, based on malonate-blocked isocyanates with melamine resins (e.g. hexamethoxymethylmelamine) as crosslinker (acid catalyzed);
16. UV-curable systems based on oligomeric urethane acrylates, or oligomeric urethane acrylates in combination with other oligomers or monomers;
17. dual cure systems, which are cured first by heat and subsequently by UV or electron irradiation, or vice versa, and whose components contain ethylenic double bonds capable to react on irradiation with UV light in presence of a photoinitiator or with an electron beam.

In addition to components (A) and (B), the coating composition according to the invention preferably comprises as component (C) a known light stabilizer of the sterically hindered amine type, the 2-(2-hydroxyphenyl)-1,3,5-triazine and/or 2-hydroxyphenyl-2H-benzotriazole type as explained above, examples are mentioned in the above list in sections 2.1, 2.6 and 2.8. Further examples for light stabilizers of the 2-(2-hydroxyphenyl)-1,3,5-triazine type advantageously to be added can be found e.g. in the publications U.S. Pat. No. 4,619,956, EP-A-434608, U.S. Pat. No. 5,198,498, U.S. Pat. No. 5,322,868, U.S. Pat. No. 5,369,140, U.S. Pat. No. 5,298,067, WO-94/18278, EP-A-704437, GB-A-2297091, WO-96/28431. Of special technical interest is the addition of the 2-(2-hydroxyphenyl)-1,3,5-triazines and/or 2-hydroxyphenyl-2H-benzotriazoles, especially the 2-(2-hydroxyphenyl)-1,3,5-triazines.

Component (C) is preferably used in an amount of 0.05–5 parts by weight per 100 parts by weight of the solid binder.

Examples of tetraalkylpiperidine derivatives which can be used advantageously as component (C) in coatings are given in EP-A-356 677, pages 3–17, sections a) to f). These sections of this EP-A are regarded as part of the present description. It is particular expedient to employ the following tetraalkylpiperidine derivatives:

bis(2,2,6,6-tetramethylpiperid-4-yl) succinate,
bis(2,2,6,6-tetramethylpiperid-4-yl) sebacate,
bis(1,2,2,6,6-pentamethylpiperid-4-yl) sebacate,
di(1,2,2,6,6-pentamethylpiperid-4-yl) butyl-(3,5-di-tert-butyl-4-hydroxybenzyl)malonate,
bis(1-octyloxy-2,2,6,6-tetramethylpiperid-4-yl) sebacate,
tetra(2,2,6,6-tetramethylpiperid-4-yl) butane-1,2,3,4-tetracarboxylate,
tetra(1,2,2,6,6-pentamethylpiperid-4-yl) butane-1,2,3,4-tetracarboxylate,
2,2,4,4-tetramethyl-7-oxa-3,20-diaza-21-oxo-dispiro [5.1.11.2]heneicosane,
8-acetyl-3-dodecyl-1,3,8-triaza-7,7,9,9-tetramethylspiro [4.5]decane-2,4-dione,
1,1-bis-(1,2,2,6,6-pentamethylpiperidine-4-yl-oxycarbonyl)-2-(4-methoxyphenyl)ethene,
or a compound of the formulae

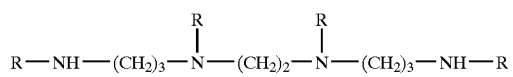

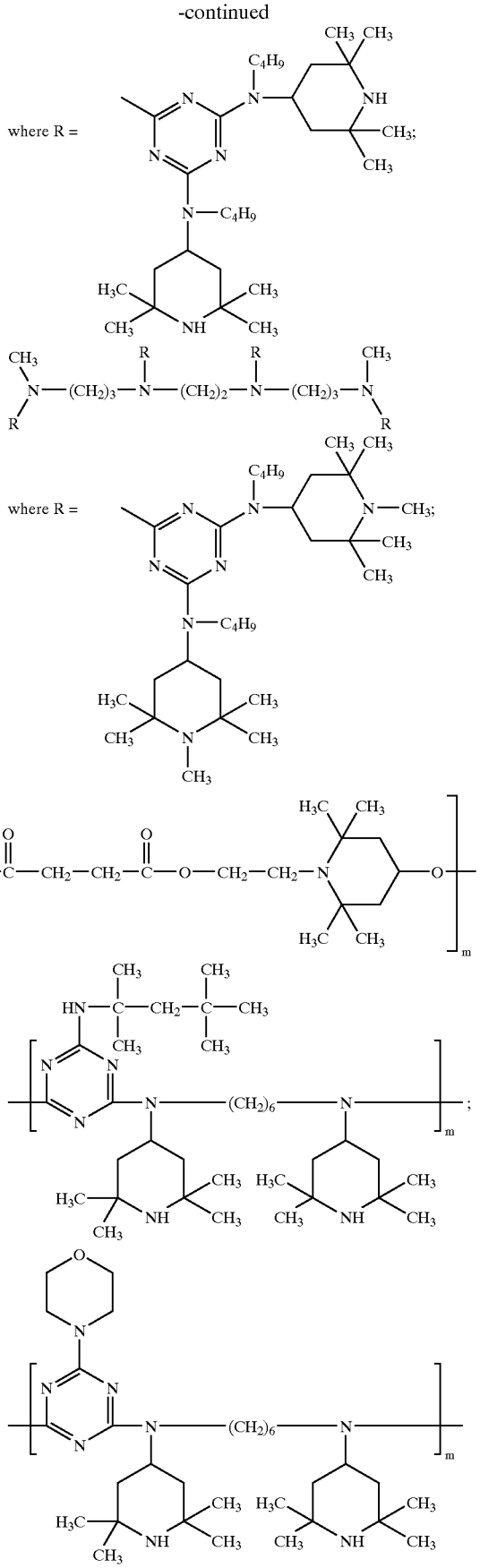

-continued

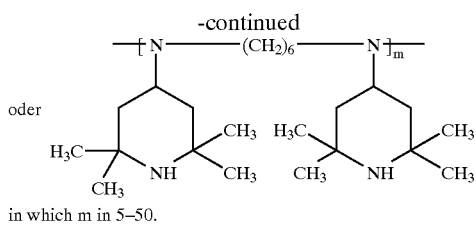

oder in which m in 5–50.

Apart from components (A), (B) and, if used, (C), the coating composition can also comprise further components, examples being solvents, pigments, dyes, plasticizers, stabilizers, thixotropic agents, drying catalysts and/or levelling agents. Examples of possible components are those described in Ullmann's Encyclopedia of Industrial Chemistry, 5th Edition, Vol. A18, pp. 429–471, VCH, Weinheim 1991.

Possible drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds such as organotin compounds, for example.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The novel coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the above-mentioned publication Ullmann's Encyclopedia of Industrial Chemistry, 5th Edition, Vol. A18, pages 451–453. In radiation-curable coating compositions, the novel stabilizers can also be employed without the addition of sterically hindered amines.

The coating compositions according to the invention can be applied to any desired substrates, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by the customary methods, for example by brushing, spraying, pouring, dipping or electrophoresis; see also Ullmann's Encyclopedia of Industrial Chemistry, 5th Edition, Vol. A18, pp. 491–500.

Depending on the binder system, the coatings can be cured at room temperature or by heating. The coatings are preferably cured at 50–150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

The invention therefore also relates to a coating, in particular a paint, which has been stabilized against the damaging effects of light, oxygen and heat by a content of the compound of the formula (I) according to the invention. The paint is preferably a topcoat for automobiles. The invention furthermore relates to a process for stabilizing a coating based on organic polymers against damage by light, oxygen and/or heat, which comprises mixing with the coating composition a mixture comprising a compound of the formula (I), and to the use of mixtures comprising a compound of the formula (I) in coating compositions as stabilizers against damage by light, oxygen and/or heat.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438–444. The powder coating material may also have the form of a powder-slurry (dispersion of the powder preferably in water).

The pigments can be inorganic, organic or metallic pigments. The novel coating compositions preferably contain no pigments and are used as a clearcoat.

Likewise preferred is the use of the coating composition as a topcoat for applications in the automobile industry, especially as a pigmented or unpigmented topcoat of the paint finish. Its use for underlying coats, however, is also possible.

The examples below illustrate the invention further. All parts or percentages, in the examples as in the remainder of the description and in the claims, are by weight, unless stated otherwise. Room temperature denotes a temperature in the range 20–30° C., unless stated otherwise. Data given for elemental analysis are in % by weight calculated (cal) or experimentally measured (exp) for the elements C, H and N. In the examples, the following abbreviations are used:

| | |
|---|---|
| % w/w | percent by weight; |
| % w/v | percent weight by volume; x % (w/v) stands for x g solid dissolved in 100 ml liquid; |
| m.p. | melting point or range; |
| PC | polycarbonate; |
| ABS | acrylonitrile-butadiene-stryene terpolymer; |
| POM | polyoxymethylene; |
| PP | polypropylene; |

| | |
|---|---|
| LDPE | low density polyethylene; |
| DSC | differential scan calorimetry; |
| NMR | nuclear magnetic resonance (of $^1$H, if not otherwise indicated). |

A: PREPARATION EXAMPLES

Example A1

Precursor compound 3,3,5,5-tetraalkyl-piperazin-2,6-dione of the formula

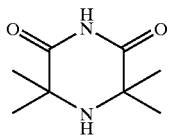

is obtained according to T. Yoshioka et al., Bull. Chem. Soc. Jap. 45, 1855–1860 (1972); m.p. 240–242° C.

Example A2

In a 1 l three necked flask equipped with a stirrer, thermometer, condenser drying tube and gas inlet tube are placed 94 g of 3,3,5,5-tetraalkyl-piperazin-2,6-dione (product of example A1) and 57 g of potassium tert-butoxide in 400 ml of dimethylacetamide. The reaction is slightly exothermic, the temperature rising to 55° C.; to the stirred solution is added dropwise 77 g of ethyl-bromoacetate, and stirring is continued for 5 hours. The reaction mixture is cooled to room temperature, then after addition of 200 ml of $CH_2Cl_2$ is poured into 200 ml of water. The organic layer is separated and concentrated under reduced pressure. The residue is dissolved in toluene, filtered and evaporated under reduced pressure. The product of the formula

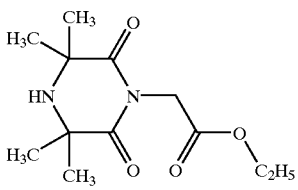

is obtained as a white residue; m.p. 58–60° C.

Example A3

The product of example A2 is charged in a 1 l three necked flask equipped with a stirrer, thermometer, condenser drying tube and gas inlet tube with 18 g of p-formaldehyde in 120 ml of tert-amylalcohol and to the reaction mixture, heated to 75° C., is added dropwise a solution of 24 g of formic acid in 100 ml of tert-amylalcohol. The reaction mixture is heated to 85° C. and kept for 6 hours, then cooled to room temperature. A solution of 21 gr of NaOH in 50 ml of water is added. The organic layer is extracted with $CH_2Cl_2$, washed with water and evaporated under reduced pressure. The product of the formula

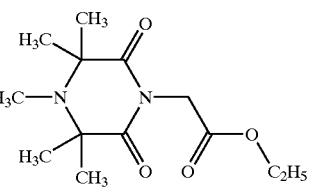

is collected as a white powder. Melting point: 59° C. (by DSC)

Example A4

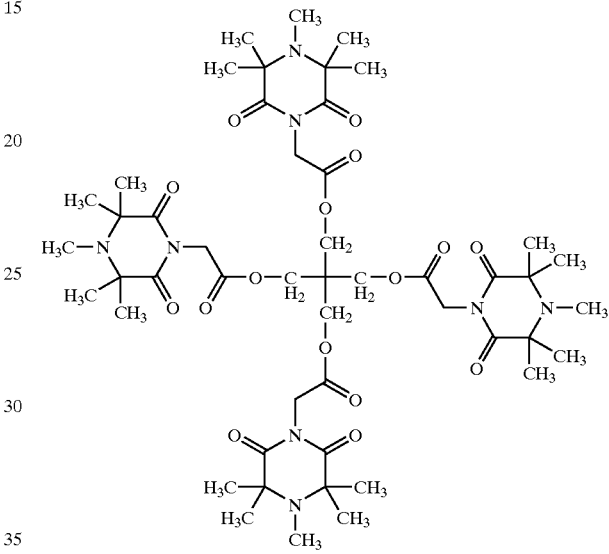

The product of example A3 is charged in a 1 l three necked flask equipped with a stirrer, thermometer, condenser drying tube and gas inlet tube with 10 g of pentaerythritol in a solution of 120 ml of xylene. 1 g of lithium amide is added to the stirred solution at 100° C. The reaction mixture is heated slowly to 135° C. and kept at this temperature for 24 hours, then cooled to room temperature and filtered and evaporated under reduced pressure. The residue is crystallized from hot n-hexane yielding the above product as a white solid of melting range 240–244° C.

| | | |
|---|---|---|
| Elemental Analysis | calculated | C = 57.0%, H = 7.4%, N = 10.8% |
| | measured | C = 57.2%, H = 7.3%, N = 10.7% |

Example A8

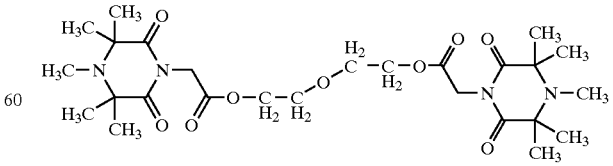

In a three necked flask equipped with a stirrer, thermometer, condenser drying tube and gas inlet tube are placed 94 gr of 3,3,5,5-tetraalkyl-piperazin-2,6-dione and 57 gr of potassium tert-butoxide in 400 ml of dimethylacetamide. The mixture is warmed up to 55° C. and 77 gr of ethyl-bromoacetate are added dropwise under stirring and left to react for additional 5 hours and cooled down to 25° C. A 200 ml portion of $CH_2Cl_2$ and 200 ml portion of water is added to the mixture under stirring and the organic layer is collected, dried over $Na_2SO_4$ and charged, together with 400 ml of xylene and 22.8 g of di-ethylen glycol, in a round bottomed flask equipped with a stirrer, thermometer, condenser drying tube and gas inlet tube. The solution is heated up to reflux temperature and 0.2 g of di-buthyl tin oxide are added to the mixture and left to react for 12 hours, then cooled down to 25° C. The solution is then concentrated under vacuum and the resulting solid is charged in a round bottomed flask equipped with a stirrer, thermometer, condenser drying tube and gas inlet tube. 350 ml of tert-amyl alcohol and 28 g of para-formaldehyde are also charged in the flask and the resulting mixture is warmed up to 75° C. and 38.5 g of formic acid is added dropwise under stirring and left to react for 3 hours keeping the temperature at 75° C., then cooled to 25° C. To the mixture are added under stirring 1400 ml of $CH_2Cl_2$ and 42.7 g of a solution of 50% NaOH in water and left to react for 1 hour at 40° C., then it is cooled down to 25° C. A 2000 ml portion of water and a 1400 ml of ethyl acetate are added to the mixture, the organic layer is separated, dried over $Na_2SO_4$ and concentrated under vacuum. The title product is obtained as a white powder of m.p. 59° C. (DSC).

Example A13

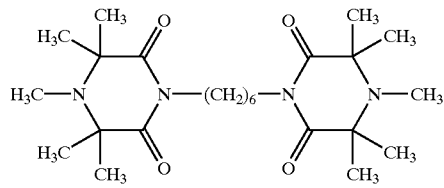

In a three necked flask equipped with a stirrer, thermometer, condenser drying tube and gas inlet tube are placed 100 gr of 3,3,5,5-tetraalkyl-piperazin-2,6-dione and 66 gr of potassium tert-butoxide in 500 ml of N,N-dimethylacetamide. The mixture is warmed up to 55° C. and 68.3 gr of 1,6-Dibromohexane are added dropwise under stirring and left to react for additional 5 hours and cooled down to 25° C. A 200 ml portion of $CH_2Cl_2$ and 200 ml portion of water are added to the mixture under stirring and the organic layer is collected, dried over $Na_2SO_4$ and evaporated under reduced pressure. The resulting solid is then charged in a round bottomed flask equipped with a stirrer, thermometer, condenser drying tube and gas inlet tube togheter with 600 ml of tert-amyl alcohol and 52 g of para-formaldehyde. The mixture is warmed up to 75° C. and 78 g of formic acid is added dropwise under stirring and left to react for 3 hours keeping the temperature at 75° C., then cooled to 25° C. To the mixture are added under stirring 2000 ml of $CH_2Cl_2$ and 74 g of a solution of 50% NaOH in water and left to react for 1 hour at 40° C., then cooled down to 25° C. A 3000 ml portion of water and a 2000 ml of ethyl acetate are added to the mixture, the organic layer is separated, dried over $Na_2SO_4$ and concentrated under vacuum. The title product is obtained as a white powder of m.p. 94° C. (DSC).

Example A24

In a three necked flask equipped with a stirrer, thermometer, condenser are charged 80 ml of N,N-dimethyl-acetamide, 42 g of 3,3,5,5-tetraalkyl-piperazin-2,6-dione and 29 g of potassium tert-butoxide. The mixture is heated up to 40° C. under stirring, then a solution of 19 g N,N-Bis-(2-chloro-ethyl)-formamide in 15 ml of N,N-dimethyl-acetamide is slowly added dropwise, keeping the temperature below 80° C. and left to react for 3 hours. The reaction mixture is cooled down to 20° C., 150 ml of methylene dichloride and 120 ml of water are added under stirring, the organic layer is collected, washed with additional 20 ml of water and concentrated under vacuum. A white solid corresponding to the formula

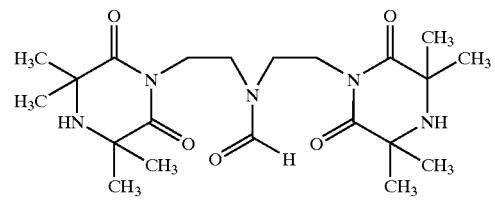

is collected; m.p. 137–139° C.

Example A25

The product of example A24 is charged in a flask equipped with a thermometer and a condenser, dissolved in 120 ml of 37% aqueous HCl, heated up to refluxing temperature and left to react for 3 hours. The mixture is then concentrated under vacuum, the resulting solid is suspended in 400 ml of methylene dichloride and a 20% solution of NaOH in water is added under stirring until the aqueous layer is neutral. The organic layer is collected, dried over sodium sulfate, and concentrated under vacuum yielding a white solid of the formula

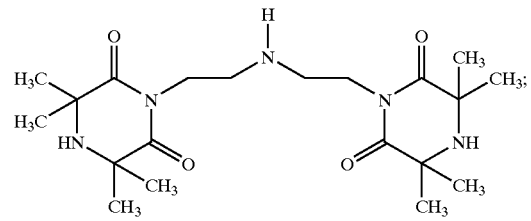

m.p. 102–104° C.

Example A17

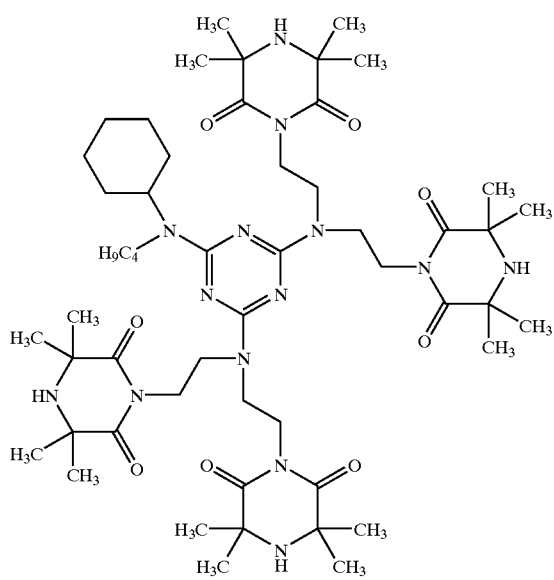

A 20.5 g portion of the product of Example A25 is added dropwise over a 30' period time in a three necked flask equipped with a stirrer, thermometer, condenser, containing 100 ml of $CH_2Cl_2$ and 9.2 g of cyanuric choride cooled down to 5° C. and left to react under stirring for 3 hours. A solution of 2 g of NaOH in 8 ml of water are added to the reaction mixture and left to reach room temperature.

Additional 20.5 g portion of the compound are added to the solution under stirring, it is heated up to refluxing temperature for 2 hours, cooled down to 25° C., 10 g of $K_2CO_3$ are added to the reaction mixture, heated up again to refluxing temperature for 3 hours and cooled down to 20° C. To the reaction mixture are then added 200 ml of xylene, 10 g of $K_2CO_3$ and 7.7 g of N,N-cyclohexyl-buthyl amine and it is heated up to 142° C. for 16 hours under stirring, cooled down to 20° C., washed with 120 ml of water and the organic layer is collected. Evaporation of the solvent under vacuum yields the title product as a white solid of m.p. 64–66° C.

Example A21

R—NH—$(CH_2)_6$—N(R)—$(CH_2)_6$—NH—R with R being

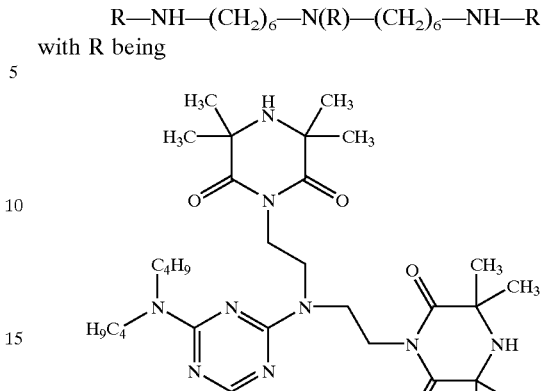

A 80 g portion of the product of Example A25 is added dropwise over 30 minutes in a three necked flask equipped with a stirrer, thermometer, condenser, containing 360 ml of $CH_2Cl_2$ and 36 g of cyanuric choride cooled to 5° C. and left to react under stirring for 3 hours. A solution of 8.6 g of NaOH in 9 ml of water is added to the reaction mixture and left to reach room temperature.

A 25 g portion of N,N-di-buthyl-amine is added to the solution under stirring, heated up to refluxing temperature for 2 hours. Subsequently, a solution of 8.6 g of NaOH in 9 ml of water is added to the reaction mixture, left to react for 3 hours, the mixture is cooled down to 20° C. and the organic layer is separated and washed with 140 ml of water. The organic layer is collected, the solvent evaporated and the resulting solid charged in a three necked flask equipped with a stirrer, thermometer, condenser, containing 300 ml of xylene and 14.3 g of bis-(hexametylene)-tri-amine. The reaction mixture is then heated up to 142° C. for 16 hours, cooled down to 20° C. and washed with 400 ml of water. The organic layer is then concentrated under vacuum obtaining a white solid of m.p. 68–77° C.

Elemental Analysis: cal: C, 61.3; H, 8.8; N, 20.4. exp: C, 61.0; H, 8.7; N, 19.9.

Examples A5–A7, A9–A12, A14–A16, A18–A20, A22 and A23

The following compounds are obtained in analogy to the method described in the above examples using the appropriate educts:

| example | formula | characterization |
|---|---|---|
| A5 | ![structure] | m.p. 120° C. (DSC) |

-continued

| example | formula | characterization |
|---|---|---|
| A6 | | m.p. 100° C. (DSC) |
| A7 | | m.p. 97° C. (DSC) |
| A9 | | m.p. 99° C. (DSC) |
| A10 | | m.p. 75° C. (DSC) |
| A11 | | m.p. 180° C. (DSC) |
| A12 | | m.p. 156° C. (DSC) |

| example | formula | characterization |
|---|---|---|
| A14 | 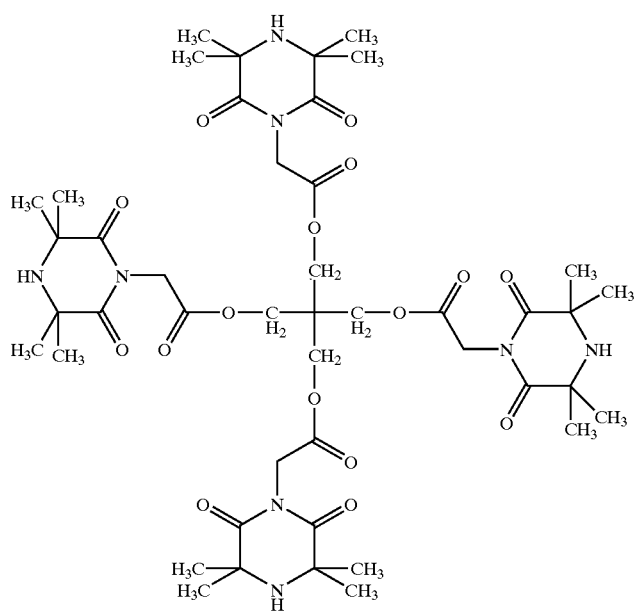 | m.p. 286° C. (DSC) |
| A15 | 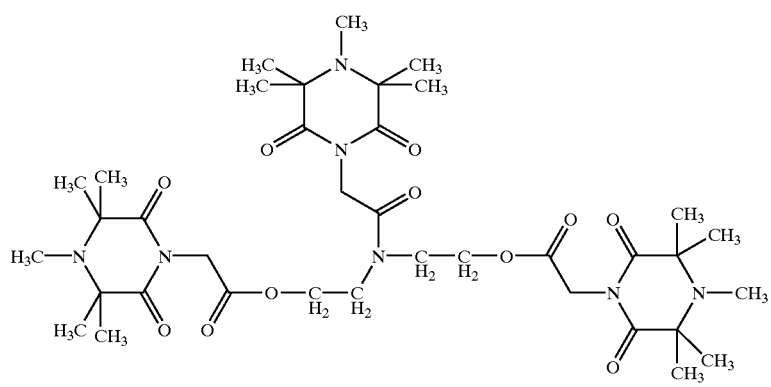 | m.p. 127° C. (DSC) |
| A16 | 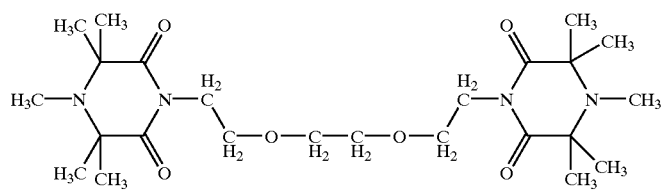 | m.p. 54–58° C. |

-continued
| example | formula | characterization |
|---|---|---|
| A18 | 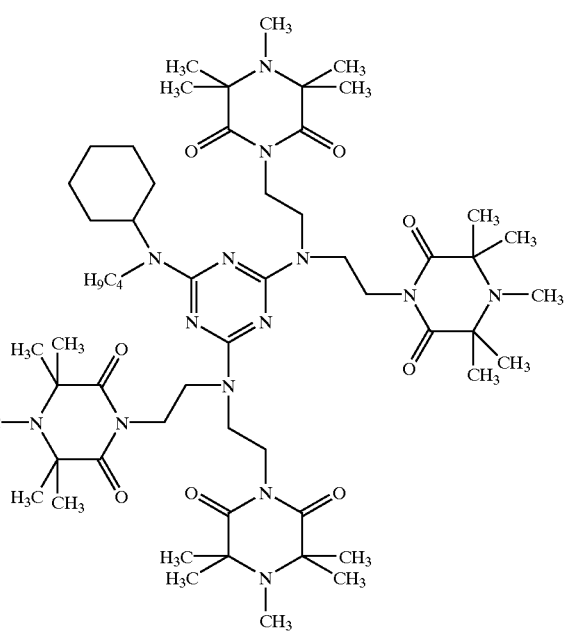 | m.p. 190° C. (DSC) |
| A19 | 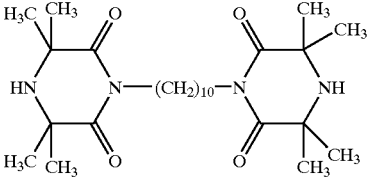 | m.p. 78° C. (DSC) |
| A20 | 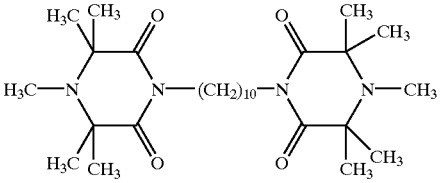 | |
$^1$H-NMR(300 MHz, CDCl$_3$)/ppm: 3.72(t, 4H); 2.32(s, 6H); 1.48(m, 4H): 1.36(s, 24H); 1.24(M, 12H)
| A22 | R—NH—(CH$_2$)$_6$—N(R)—(CH$_2$)$_6$—NH—R with<br>R being 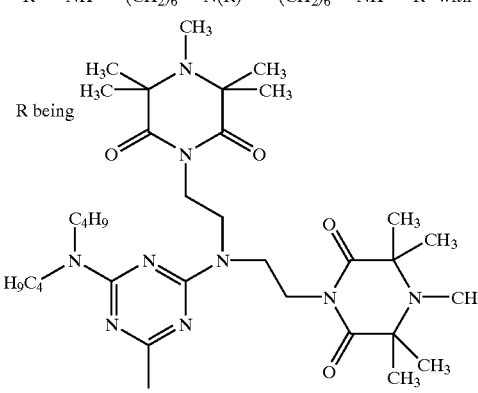 | m.p. 66–72° C. |
Elemental Analysis: cal: C62.3, H9.0, N19.6; exp: C61.7, H8.9, N19.2

-continued

| example | formula | characterization |
|---|---|---|
| A23 | (structure: cyclohexyl-O-N[C(CH3)2-C(=O)]2N-(CH2)10-N[C(=O)-C(CH3)2]2N-O-cyclohexyl) | $^1$H-NMR(300MHz, CDCl$_3$)/ppm: 3.69(t, 4H); 3.58(m, 2H); 2.4(m, 4H); 1.73(m, 4H); 1.45(m, 26H); 1.22(m, 26H). |

B: APPLICATION EXAMPLES

Example B1

Light-Stabilizing Action in Polypropylene Plaques 1 g each of the compounds indicated in Table 1 and 1 g of tris(2,4-di-t-butylphenyl)phosphite, 0.5 g of pentaerythritol tetrakis [3-(3,5-di-t-butyl-4-hydroxy phenyl) propionate], 1 g of calcium stearate and 1 g of Filofin Blue 4G are mixed in a turbo mixer with 1000 g of polypropylene powder (MOPLEN™ SSF) of melt index=3.7 g/10 minutes (measured at 230° C. an 2.16 kg).

The mixtures obtained are extruded at a temperature of 200–230° C. to give polymer granules which are then converted into plaques of 2 mm thickness by injection moulding at 200–220° C. The plaques obtained are exposed in a model 65 WR Weather-O-Meter (ASTM D2565-85) with a black panel temperature of (63±3)° C. until surface embrittlement (chalking) starts. Further samples are exposed until a roughness parameter $R_a$=0.5 μm is reached; evaluation is done using a measurement unit for surface texture (Surtronic™ model 3+; Lc=0.8 mm; Ln=4.0 mm, Lc being the cut-off length, i.e. the lenght of the reference line used for identifying the irregularities characterising the surface and Ln being the total evaluation length).

A plaque of polypropylene prepared under the same conditions as indicated above but without the addition of the compounds of the invention is exposed for comparison.

In Table 1, the exposure time needed is given in hours. The longer the time the better is the stabilizing effect.

TABLE 1

| Stabilizer | $R_a$ = 0.5 μm after (hours) | Chalking time (hours) |
|---|---|---|
| without stabilizer | | 500 |
| compound of Example A12 | 3200 | 3450 |
| compound of Example A13 | 4090 | 4020 |
| compound of Example A16 | 3580 | 3450 |

Example B2

Light-Stabilizing Action in Polypropylene Tapes 1 g of each of the compounds listed in Table 2, 1 g of tris[2,4-di-tert-butylphenyl]phosphite, 0.5 g of pentaerythritol tetrakis[3-(3,5-di-tert-butyl-4-hydroxy-phenyl) propionate] and 1 g of calcium stearate are mixed in a turbomixer with 1000 g of polypropylene powder (MOPLEN™ SSF, having a melt index of 3.7 measured at 230° C. and 2.16 kg).

The mixtures are extruded at 200–220° C. to give polymer granules which are subsequently converted to stretched tapes of 50 rum thickness and 2.5 mm width, using a semi-industrial type of apparatus (®Leonard-Sumirago (VA)—Italy) and waking under the following conditions:

| | |
|---|---|
| Extruder temperature: | 200–230° C. |
| Head temperature: | 240–260°C. |
| Stretch ratio: | 1:6 |

The tapes thus prepared are mounted on a white card and exposed in a Weather-O-Meter 65 WR (ASTM D 2565-85) with a black panel temperature of (63±3)° C.

The residual tenacity is measured, by means of a constant velocity tensometer, on a sample taken after various light exposure times; from this, the exposure time (in hours) required to halve the initial tenacity ($T_{50}$) is measured.

By way of comparison, tapes prepared under the same conditions as indicated above, but without the addition of the stabilizers of the present invention, are exposed. The results are shown in Table 2.

TABLE 2

| Stabilizer | $T_{50}$ (hours) |
|---|---|
| without stabilizer | 500 |
| compound of Example A8 | 1640 |
| compound of Example A10 | 1610 |
| compound of Example A13 | 2110 |
| compound of Example A16 | 1910 |

Example B3

Light-Stabilizing Action in Polypropylene Fibers 1 g of the compound indicated in table 3 below together with 1 g of calcium stearate, 2.5 g of TiO$_2$ (Kronos™ RN 57) and a blend of 0.5 g of calcium monoethyl 3,5-di-tert-butyl-4-hydroxybenzyl phosphonate and 0.5 g of tris(2,4-di-tert-butylphenyl) phosphite are mixed with 1000 g of polypropylene powder (Moplen™ FLF 20; melt flow index 12.2 g/l 0 min, measured at 230° C. and 2.16 kg) in a turbo mixer.

The mixtures are extruded at 190–230° C. to give granules; these are subsequently converted into fibres using a a semi-industrial type of apparatus (Leonard-Sumirago™ (VA), Italy) under the following conditions:

| | |
|---|---|
| Extruder temperature: | 200–230° C. |
| Head temperature: | 255° C. |
| Stretch ratio: | 1:3.5 |
| Count: | 11 dtex per filament |

The fibres produced in this way are exposed against a white cardboard in a Weather-O-Meter™ Type 65WR with a black panel temperature of (63+3)° C. in accordance with ASTM D 2565-85. After various exposure times, the residual tensile strength of the samples is measured by means of a constant-speed tensometer. The exposure time $T_{50}$ needed to halve the initial tensile strength is then calculated. The results are shown in Table 3 below. The amount data are based on the weight of the polypropylene employed.

TABLE 3

Exposure duration ($T_{50}$/h) for the tensile strength to half

| Stabilizer | $T_{50}$/h |
|---|---|
| none | 300 |
| A21 | 1100 |
| A22 | 1280 |

The fibres stabilized according to the invention have excellent tenacity.

Example B4

Stabilization of Polyethylene Films

The additives reported in table 4 below are mixed via masterbatch with LDPE pellets (Riblene™ FF 29; d=0.921 g/cm; MFI (190° C./2.16 kg)=0.60 g/10 min.) in a turbo mixer. The mixtures are extruded at 200° C. to obtain granules that are converted into films of thickness 150 μm by compression molding (170° C./3 min.).

Some of the films are treated with pesticides by storing them before WOM exposure for 20 days at 30° C. over a concentrated solution of VAPAM™ in water (1:1 relation in parts by volume) without direct contact with the solution.

VAPAM™ (BASLINI SpA, Treviglio/BG, Italy) is an aqueous solution of 382 g per liter of metam-sodium having the formula $CH_3$—NH—CS—SNa.

Film samples are then mounted in quartz tubes and exposed against a white cardboard in a Weather-O-Meter™ (WOM) Type 65 WR with a black panel temperature of (63±3)° C. The degradation process is monitored by measuring the increase of carbonyl in the sample with a Fourier Transform Infrared Spectrophotometer. A high increase of carbonyl indicates high degradation. The results are given in the following table 4 (arbitrary units). The amount data are based on the weight of the polyethylene employed.

TABLE 4

Increase of carbonyl concentration (iCO) after the indicated exposure (WOM)

| Stabilizer | iCO after 875 h WOM | iCO after pesticide treatment and 765 h WOM |
|---|---|---|
| none | 0.4 | 0.8 |
| 0.3% A21 | 0.037 | 0.072 |
| 0.3% A22 | 0.046 | 0.078 |

It is evident, that the stabilizer of the invention provides effective stabilization for PE films both with and without pesticide treatment.

Example B5

Stabilization of a Gray Pigmented Polycarbonate/ABS Blend

Commercial PC/ABS-blend (Cycoloy™ MC 8002; 50/50 wt/wt blend of PC and ABS pigmented with 1% by weight of Gray 9779 is stabilized by addition of 1% by weight of 2-(2'-hydroxy-3',5'-bis(1,1-dimethylbenzyl)phenyl)-benztriazole (C) and 0.5% by weight of the compound indicated in table 5. A sample containing only the 1% by weight of the benztriazole stabilizer and an unstabilized sample serve as comparison. Izod bars (2.5"L×0.5"W×0.125"W) are prepared by injection molding on a BOY 30 machine, barrel temperature 475–5150F, die temperature 515° F. Accelerated weathering is performed using an Atlas Ci65A Weather-o-meter (XAW), operated in either "Dry XAW" mode (ASTM G26-90 method C). After regular intervals, the color change ΔE according to DIN 6174 is determined. Results are compiled in table 5.

TABLE 5

Color change (ΔE) of gray pigmented PC after the indicated irradiance time

| Irradiance time: Stabilizer | 94.8 h ΔE | 500.5 h ΔE | 999.7 h ΔE | 1249.0 h ΔE |
|---|---|---|---|---|
| none | 1.5 | 6.9 | 9.8 | 11.0 |
| C | 0.7 | 4.2 | 7.7 | 9.0 |
| C + A11 | 0.5 | 3.1 | 6.2 | 7.2 |
| C + A14 | 0.2 | 2.3 | 5.4 | 7.0 |
| C + A4 | 0.3 | 2.1 | 5.0 | 6.5 |
| C + A17 | 0.3 | 1.7 | 4.3 | 5.7 |

Example B6

Stabilization of a White Pigmented Polycarbonate/ABS Blend

Samples are prepared from commercial PC/ABS-blend (Cycoloy™ MC 8002; 50/50 wt/wt blend of PC and ABS as described in example B5 except that $TiO_2$ (Tiona™ RCL-4 rutile; SCM chemicals) is used as pigment. Weathering and assessment is done as described in example B5; results are compiled in table 6.

TABLE 6

Color change (ΔE) of white pigmented PC after the indicated irradiance time

| Irradiance time:<br>Stabilizer | 499.3 h<br>ΔE | 999.8 h<br>ΔE | 1249.3 h<br>ΔE |
|---|---|---|---|
| none | 11.6 | 21.8 | 23.7 |
| C | 6.0 | 15.7 | 17.4 |
| C + A11 | 2.6 | 10.2 | 11.7 |
| C + A14 | 2.3 | 9.3 | 11.3 |
| C + A4 | 2.7 | 9.6 | 11.4 |
| C + A17 | 2.2 | 9.2 | 10.7 |

PC/ABS samples stabilized according to the invention show an excellent color stability.

Example B7

Gloss and Chip Impact Strength of Stabilized PC/ABS

Further samples prepared and exposed to weathering as shown in examples B5 and B6 are assessed in respect of gloss and chip impact strength.

Gloss: 2"×2" injection molded plaques are removed and replaced at each interval. Measurement device is BYK-Gardner Haze-Gloss Laboratory Reference Instrument.
Chip impact testing: 10 replicate bars are used for each test interval, impacting the exposed face. Test conducted per ASTM D4508-90 using TMI Monitor/impact Tester.

PC/ABS samples stabilized according to the invention with 0.5% by weight of the compound of example A4 or A17 show excellent gloss retention and impact strength.

Example B8

Stabilization of a 2-Coat Metallic Finish

The light-stabilizers to be tested are dissolved in 30 g of Solvesso®100 and tested in a clearcoat having the following composition (parts by weight):

| | |
|---|---|
| Synthacryl ® SC 303 [1] | 27.51 |
| Synthacryl ® SC 370 [2] | 23.34 |
| Maprenal ® 650 [3] | 27.29 |
| Butyl acetate/Butanol (37/8) | 4.33 |
| Isobutanol | 4.87 |
| Solvesso ® 150 [4] | 2.72 |
| Crystal Oil K-30 [5] | 8.74 |
| Levelling assistant Baysilon ® MA [6] | 1.20 |
| | 100.00 |

[1] Acrylate resin, ® Hoechst AG; 65% solution in xylene/butanol (26:9)
[2] Acrylate resin, ® Hoechst AG; 75% solution in Solvesso ® 100[4]
[3] Melamine resin, ® Hoechst AG; 55% solution in isobutanol
[4] aromatic hydrocarbon mixture, boiling range: 182–203° C. (Solvesso ® 150) or 161–178° C. (Solvesso ® 100); manufacturer: ® Esso
[5] aliphatic hydrocarbon mixture, boiling range: 145–200° C.; manufacturer: ® Shell
[6] 1% in Solvesso ® 150; manufacturer: ® Bayer AG 1% of the light-stabilizers to be tested is added to the clearcoat, based on the solids content of the varnish. For comparison, a clearcoat containing no light-stabilizers is used.
The clearcoat is diluted with Solvesso® 100 to spray viscosity and is applied by spraying to a prepared aluminium panel (®Uniprime Epoxy, silver-metallic basecoat) which is baked at 130° C., for 30 minutes, to give a dry film thickness of 40–50 gm of clearcoat.
The samples are then weathered in an Atlas ®UVCON weathering unit (UVB-313 lamps) in a cycle comprising UV irradiation at 70° C. for 4 hours and condensation at 50° C. for 4 hours. The surface gloss (200 gloss as defined in DIN 67530) of the samples is then measured at regular intervals. The results are shown in Table 8.

TABLE 8

| | 20° * gloss as defined in DIN 67530 after . . . hours weathering in the ® UVCON (UVB-313) | |
|---|---|---|
| Light-stabilizer | 0 hours | 400 hours |
| None | 93 | 77 |
| A7 | 93 | 83 |
| A8 | 93 | 85 |
| A9 | 93 | 86 |
| A10 | 93 | 81 |
| A12 | 93 | 86 |
| A13 | 93 | 89 |

* high values indicate a good stabilization

The results listed in Table 8 show that the samples stabilized with a stabilizer according to the invention have better weathering stability (gloss retention) than the unstabilized sample.

Example B9

Stabilization of Thermoplastic Olefins

Molded test specimens are prepared by injection molding thermoplastic olefin (TPO) pellets containing pigments, a phosphite, a phenolic antioxidant or hydroxylamine (HA), a metal stearate, ultraviolet light absorbers (UVA) or a hindered amine stabilizers (HALS) or a mixture of UV absorbers and hindered amine stabilizers as described below.

Pigmented TPO pellets are prepared from pure pigment or pigment concentrates, stabilizers, co-additives and commercially available thermoplastic olefin by mixing the components in a Superior/MPM 1" single screw extruder with a general all-purpose screw (24:1 LID) at 400° F. (200° C.), cooled in a water bath and pelletized. The resulting pellets are molded into 60 mil (0.006 inch thick) 2"×2" plaques at about 375° F. (190° C.) on a BOY 30M Injection Molding Machine.

Pigmented TPO formulations composed of polypropylene blended with a rubber modifier where the rubber modifier is an in-situ reacted copolymer or blended product containing copolymers of propylene and ethylene with or without a ternary component such as ethylidene norbornene are stabilized with a base stabilization system consisting of an N,N-dialkylhydroxylamine or a hindered phenolic antioxidant with or without an organophosphorous compound.

All additive and pigment concentrations in the final formulations are expressed as weight percent based on the resin.

Formulations contain thermoplastic olefin pellets and one or more of the following components;

0.0%–2.0% pigment,
0.0%–50.0% talc
0.0%–0.1% phosphite,
0.0%–1.25% phenolic antioxidant,
0.0%–0.1% hydroxylamine,
0.05%–0.10% calcium stearate, 0.0%–1.25% UV absorber,
0.0%–1.25% hindered amine stabilizer (HALS).

The components are dry blended in a tumble dryer prior to extrusion and molding.

Test plaques are mounted in metal frames and exposed in an Atlas Ci65 Xenon Arc Weather-o-meter at 70° C. black panel temperature, 0.55 W/m$^2$ at 340 nanometers and 50% relative humidity with intermittent light/dark cycles and water spray (Society of Automotive Engineers—SAE J 1960 Test Procedure). Specimens are tested at approximately 625 kilojoule intervals by performing color measurements on an Applied Color Systems spectrophotometer by reflectance mode according to ASTM D 2244-79. Data collected include delta E, L*, a* and b* values. Gloss measurements are conducted on a BYK-GARDNER Haze/Gloss Meter at 60° according to ASTM D523.

UV Exposure Testing

Test specimens prepared from a commercially available polyolefin blend (Polytrope TPP 518-01; commercial supplier A. Schulman, Inc.; Akron, Ohio, U.S.A.) as 60 mil thick 2"×2" injection molded plaques are exposed to UV radiation under SAE J 1960—Exterior Automotive conditions.

The Control sample contains as stabilizer formulation the compound A as indicated in the following table, 0.2% by weight of compound B and 0.1% of a 1:1 mixture of tris(2,4-di-t-butylphenyl)phosphite and 1 part of pentaerythritol tetrakis[3-(3,5-di-t-butyl-4-hydroxyphenyl)propionate] in the final resin formulation as commonly used in the industry to impart UV stability.

Samples 1–3 stabilized according to the invention contain 0.05% dialkylhydroxylamine in the final resin formulation as base stabilization and 0.2% by weight of compound C costabilizer. Compound A is Bis(2,2,6,6-tetramethylpiperidine-4-yl) sebacate;
compound B is Poly [[6-[(1,1,3,3-tetramethyl butyl) amino]-1,3,5-triazine-2,4-diyl][[(2,2,6,6-tetramethyl-4-piperidyl) imino] hexamethylene [(2,2,6,6-tetramethyl-4-piperidyl) imino]]; CAS-No. 70624-18-9; compound C is of the formula R—NH—(CH$_2$)$_3$—N(R)—(CH$_2$)$_2$—N(R)—(CH$_2$)$_3$—NH—R, with R being

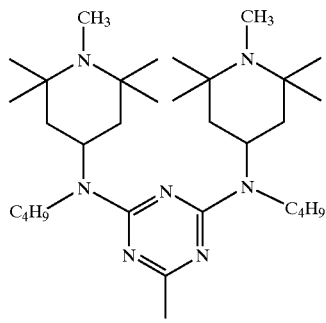

(CAS-No. 106990-43-6). Compounds A, B and C are commercial stabilizers (Ciba Specialty Chemicals Inc.).

All of the samples contain talc at 15%, 2-(2-hydroxy-3,5-di-tert-amylphenyl)-2H-benzotriazole at 0.2%, 0.1% calcium stearate and as color package 0.25% Red 3B and Pigment Red 177, C.I. # 65300.

All additive and pigment concentrations in the final formulations are expressed as weight percent on the resin.

TABLE 9

UV exposure testing of Polytrope TPP plaques

| Sample | HALS | delta E 3000 Kj/m$^2$ | Gloss 3000 Kj/m$^2$ | % Gloss Retention 3000 Kj/m$^2$ |
| --- | --- | --- | --- | --- |
| Control | 0.20% A | 4.7 | 5.4 | 8.1% |
| 1 | 0.20% A9 | 1.9 | 21.8 | 32.1% |
| 2 | 0.20% A19 | 2.2 | 27.2 | 40.6% |
| 3 | 0.20% A13 | 2.3 | 15.9 | 27.3% |

Samples exhibit exceptional resistance to photodegradation when stabilized with light stabilizer systems comprising a piperazinedione of present invention. In all cases, the light stabilized formulations show much greater resistance to photodegradation than unstabilized specimens which fail quickly under the UV exposure conditions outlined above.

What is claimed is:

1. Compound of one of the formulae a to e, h to p, r and t:

a.
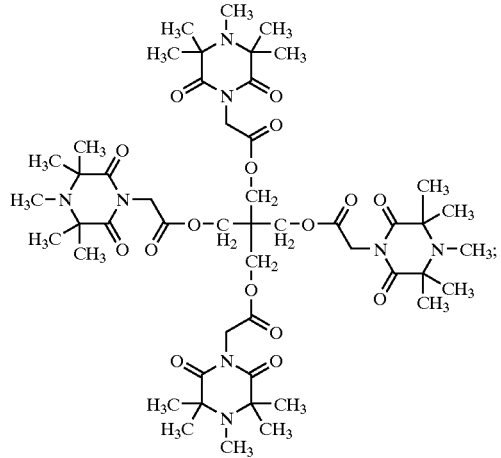

b.
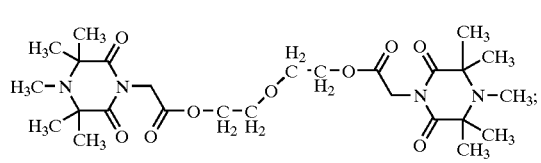

c.
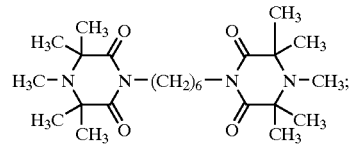

d.
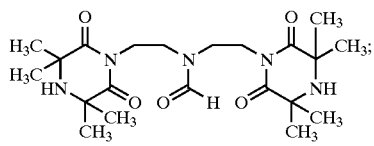

e.
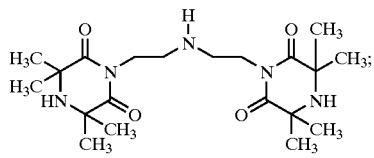

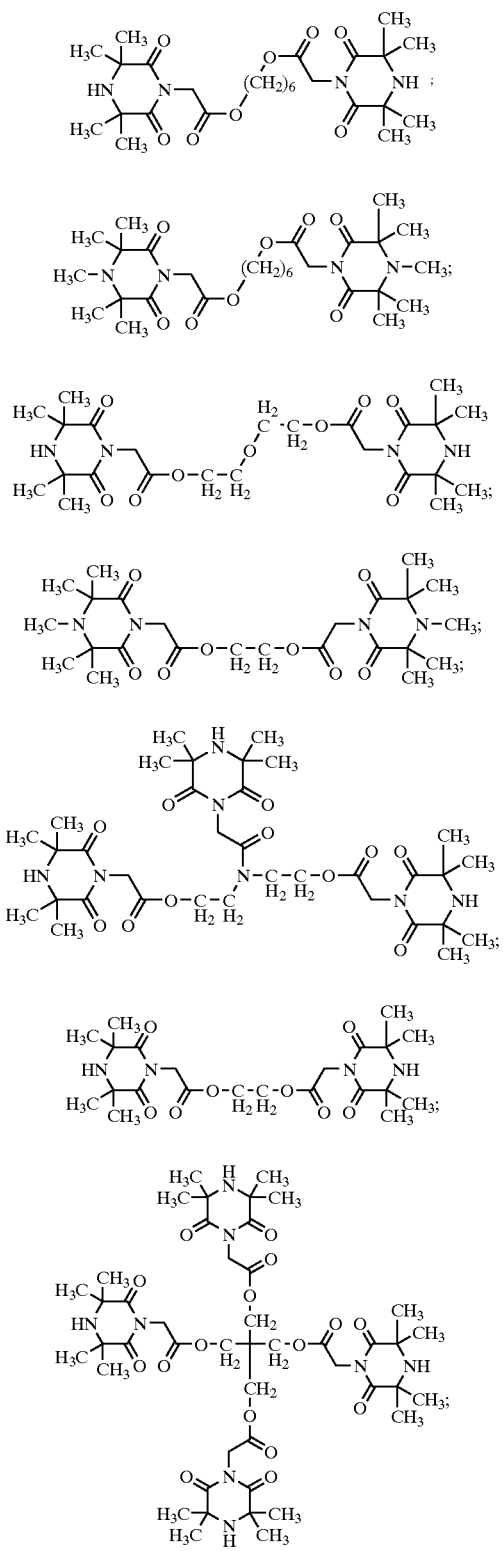
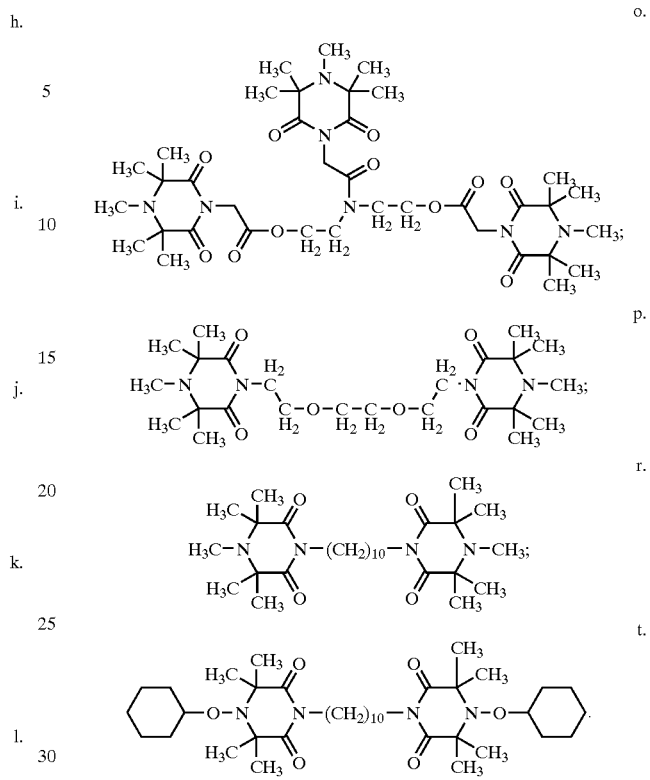

2. A composition comprising

A) an organic material sensitive to damage by light, oxygen and/or heat, and

B) as stabilizer a compound selected from the around comprising formulae a to e, h to p, r and t: according to claim 1.

3. A composition according to claim 2 comprising as organic material a thermoplastic organic polymer or a binder for a coating or a photographic material.

4. A composition according to claim 2 comprising from 0.1 to 10% by weight, based on the material to be stabilized, of the stabilizer of component B.

5. A composition according to claim 2 comprising a further component selected from solvents, pigments, dyes, plasticizers, antioxidants, stabilizers, thixotropic agents, levelling assistants, further light stabilizers, metal passivators, phosphites and phosphonites.

6. A composition according to claim 5 comprising as further component a light stabilizer from the class of the 2-hydroxyphenyltriazines and/or 2-hydroxyphenylbenzotriazoles.

7. A process for stabilizing an organic material against damage by light, oxygen and/or heat, which comprises adding to or applying to said material a compound selected from the group comprising the formulae a to e, h to p, r and t:-according to claim 1.

* * * * *